US009754392B2

(12) United States Patent
Fernandez et al.

(10) Patent No.: US 9,754,392 B2
(45) Date of Patent: Sep. 5, 2017

(54) GENERATING DATA-MAPPED VISUALIZATION OF DATA

(71) Applicant: Microsoft Technology Licensing, LLC, Redmond, WA (US)

(72) Inventors: Roland Lucas Fernandez, Woodinville, WA (US); Steven M. Drucker, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

(21) Appl. No.: 13/919,007

(22) Filed: Jun. 17, 2013

(65) Prior Publication Data
US 2014/0247271 A1    Sep. 4, 2014

Related U.S. Application Data

(60) Provisional application No. 61/772,504, filed on Mar. 4, 2013.

(51) Int. Cl.
*G06T 11/20* (2006.01)
*G06T 15/00* (2011.01)
*G06F 9/44* (2006.01)

(52) U.S. Cl.
CPC .......... *G06T 11/206* (2013.01); *G06F 9/4443* (2013.01); *G06T 15/005* (2013.01)

(58) Field of Classification Search
CPC .................................. G06T 19/20; G06T 1/20
See application file for complete search history.

(56) References Cited

U.S. PATENT DOCUMENTS

| 5,511,198 | A | * | 4/1996 | Hotta | ....................... G06F 8/445 717/146 |
|---|---|---|---|---|---|
| 5,692,206 | A | | 11/1997 | Shirley et al. | |
| 5,894,311 | A | | 4/1999 | Jackson | |
| 5,960,432 | A | | 9/1999 | Werner | |
| 6,990,238 | B1 | | 1/2006 | Saffer et al. | |
| 7,437,764 | B1 | | 10/2008 | Sobel et al. | |
| 7,475,151 | B2 | | 1/2009 | Delany et al. | |

(Continued)

FOREIGN PATENT DOCUMENTS

| CN | 1753031 A | 3/2006 |
|---|---|---|
| WO | WO 0215032 | 2/2002 |

(Continued)

OTHER PUBLICATIONS

C++ Language Tutorial, Juan Soulie, Jun. 2007.*

(Continued)

*Primary Examiner* — Barry Drennan
*Assistant Examiner* — Jason Pringle-Parker

(57) ABSTRACT

Aspects of the subject matter described herein relate to data visualization. In aspects, a caller sends a request to draw a set of shapes that have a shape type common among the shapes. The request may be for a static drawing or 1 of N animation frames. If the device has a graphical processing unit (GPU) that is available, GPU code is generated for the GPU to draw the set of shapes. Otherwise, CPU code is generated to draw the set of shapes. The drawing code is tailored to the constant, data-mapped, and animated attribute values specified by the caller and omits conditional statements that test values that are computable prior to drawing the shapes.

19 Claims, 15 Drawing Sheets

(56) References Cited

U.S. PATENT DOCUMENTS

| | | | |
|---|---|---|---|
| 7,527,195 | B2 | 5/2009 | Keithley et al. |
| 7,543,228 | B2 | 6/2009 | Kelkar et al. |
| 7,694,191 | B1 | 4/2010 | Bono et al. |
| 7,747,938 | B2 | 6/2010 | Elkady |
| 7,757,167 | B2 | 7/2010 | Kobashi et al. |
| 7,870,485 | B2 | 1/2011 | Seliutin et al. |
| 8,037,101 | B1 | 10/2011 | Bargas et al. |
| 8,234,570 | B2 | 7/2012 | Ananthanarayanan et al. |
| 8,271,949 | B2 | 9/2012 | Bernardini et al. |
| 8,707,385 | B2 | 4/2014 | Jain et al. |
| 9,070,227 | B2 | 6/2015 | Drucker |
| 9,137,237 | B2 | 9/2015 | Tejerina et al. |
| 2002/0042687 | A1 | 4/2002 | Tracy et al. |
| 2004/0006704 | A1 | 1/2004 | Dahlstrom et al. |
| 2004/0102923 | A1 | 5/2004 | Tracey et al. |
| 2004/0250062 | A1 | 12/2004 | Douglas |
| 2005/0010819 | A1 | 1/2005 | Williams et al. |
| 2005/0091067 | A1 | 4/2005 | Johnson |
| 2005/0228688 | A1 | 10/2005 | Visser et al. |
| 2005/0235287 | A1* | 10/2005 | Harper .............. G06T 1/20 718/100 |
| 2005/0257267 | A1 | 11/2005 | Williams et al. |
| 2005/0275655 | A1 | 12/2005 | Stolze et al. |
| 2006/0010049 | A1 | 1/2006 | Sunde |
| 2006/0059026 | A1 | 3/2006 | King et al. |
| 2006/0075219 | A1 | 4/2006 | Callaghan et al. |
| 2006/0082577 | A1 | 4/2006 | Carter |
| 2006/0090206 | A1 | 4/2006 | Ladner et al. |
| 2006/0101517 | A1 | 5/2006 | Banzhof et al. |
| 2006/0200358 | A1 | 9/2006 | Ohnemus et al. |
| 2006/0233114 | A1 | 10/2006 | Alam et al. |
| 2007/0101432 | A1 | 5/2007 | Carpenter |
| 2007/0124797 | A1 | 5/2007 | Gupta et al. |
| 2008/0165186 | A1 | 7/2008 | Lin |
| 2008/0177799 | A1 | 7/2008 | Wilson |
| 2008/0183459 | A1 | 7/2008 | Simonsen et al. |
| 2008/0189788 | A1 | 8/2008 | Bahl |
| 2008/0192056 | A1 | 8/2008 | Robertson et al. |
| 2008/0270316 | A1 | 10/2008 | Guidotti et al. |
| 2009/0007264 | A1 | 1/2009 | Chatterjee et al. |
| 2009/0013281 | A1 | 1/2009 | Helfman et al. |
| 2009/0021517 | A1 | 1/2009 | Foslien |
| 2009/0187963 | A1 | 7/2009 | Bori |
| 2009/0205011 | A1 | 8/2009 | Jain et al. |
| 2009/0205012 | A1 | 8/2009 | Jain et al. |
| 2009/0276695 | A1 | 11/2009 | Hodges et al. |
| 2010/0005008 | A1* | 1/2010 | Duncker et al. .............. 705/27 |
| 2010/0201692 | A1* | 8/2010 | Niles .............. G06T 13/20 345/473 |
| 2010/0214299 | A1 | 8/2010 | Robertson et al. |
| 2010/0223541 | A1 | 9/2010 | Clee et al. |
| 2010/0277507 | A1 | 11/2010 | Allyn et al. |
| 2011/0112974 | A1 | 5/2011 | Hinton et al. |
| 2011/0179477 | A1 | 7/2011 | Starnes et al. |
| 2011/0187711 | A1 | 8/2011 | Giovinazzi et al. |
| 2011/0252411 | A1* | 10/2011 | Martin .............. G06F 8/456 717/149 |
| 2011/0261049 | A1 | 10/2011 | Cardno et al. |
| 2011/0264438 | A1 | 10/2011 | Chiu et al. |
| 2012/0053986 | A1 | 3/2012 | Cardno et al. |
| 2012/0117608 | A1 | 5/2012 | Metke et al. |
| 2012/0151389 | A1 | 6/2012 | Bishop et al. |
| 2012/0218254 | A1 | 8/2012 | Abeln |
| 2012/0283959 | A1 | 11/2012 | Ruzic et al. |
| 2012/0313949 | A1 | 12/2012 | Rope et al. |
| 2012/0313957 | A1 | 12/2012 | Fisher et al. |
| 2013/0055394 | A1 | 2/2013 | Beresnevichiene et al. |
| 2013/0067581 | A1 | 3/2013 | Venketeshwar |
| 2013/0073704 | A1 | 3/2013 | Whitlock et al. |
| 2013/0198799 | A1 | 8/2013 | Staggs et al. |
| 2013/0198848 | A1 | 8/2013 | Wolff |
| 2013/0205364 | A1 | 8/2013 | Kiehtreiber et al. |
| 2013/0227636 | A1 | 8/2013 | Bettini et al. |
| 2013/0298244 | A1 | 11/2013 | Kumar et al. |
| 2013/0342538 | A1 | 12/2013 | Kozine |
| 2014/0109176 | A1 | 4/2014 | Barton et al. |
| 2014/0109178 | A1 | 4/2014 | Barton et al. |
| 2014/0173411 | A1 | 6/2014 | Sekharan |
| 2014/0195445 | A1 | 7/2014 | Abuelsaad et al. |
| 2014/0337528 | A1 | 11/2014 | Barton et al. |
| 2014/0351939 | A1 | 11/2014 | Moore et al. |
| 2015/0339286 | A1 | 11/2015 | Tejerina et al. |
| 2016/0042540 | A1 | 2/2016 | Drucker et al. |
| 2016/0094544 | A1 | 3/2016 | Tejerina et al. |

FOREIGN PATENT DOCUMENTS

| | | |
|---|---|---|
| WO | 2014137856 A2 | 9/2014 |
| WO | 2014137948 | 9/2014 |

OTHER PUBLICATIONS

PCT Application No. PCT/US2014/020045, PCT Chapter II Demand (including Claims amended under Article 34 PCT and Letter Accompanying the Amendments under Article 34 PCT), dated Sep. 12, 2014, 23 pages.

Daniel A. Keim, "Designing Pixel-Oriented Visualization Techniques: Theory and Applications", IEEE Transactions on Visualization and Computer Graphics, vol. 6, No. 1, Jan.-Mar. 2000, pp. 59-78.

Keim, et al., "Pixel Bar Charts: A Visualization Technique for Very Large Multi-Attribute Data Sets", Retrieved Feb. 25, 2013 at <<http://kops.ub.uni-konstanz.de/bitstream/handle/urn:nbn:de:bsz:352-opus-69861/pbc01.pdf?sequence=1>>, Information Visualization, vol. 1, Issue 1, Mar. 2002, pp. 20-34.

Yang, et al., "Analysis Guided Visual Exploration of Multivariate Data", Retrieved Feb. 21, 2013 at <<http://ieeexplore.ieee.org/stamp/stamp.jsp?tp=&arnumber=4389000>>, In Proceedings of the 2007 IEEE Symposium on Visual Analytics Science and Technology (VAST '07), 2007, pp. 83-90.

Heer, et al., "Interactive Dynamics for Visual Analysis," Retrieved Feb. 21, 2013 at <<http://delivery.acm.org/10.1145/2150000/2146416/p30-heer.pdf>>, ACM Queue, vol. 10 No. 2, Feb. 2012, 26 pages.

Miller, et al., "EVEVis: A Multi-Scale Visualization System for Dense Evolutionary Data," Retrieved Feb. 21, 2013 at <<http://vis.cs.ucdavis.edu/papers/evevis-evolutionary-vis.pdf>>, In Proceedings of 2011 IEEE Symposium on Biological Data Visualization (BioVis), Oct. 23, 2011, pp. 143-150.

North, Peter, "Visualize Your Data and Speed up Your Site with Dynamic Chart Libraries," Retrieved Feb. 21, 2013 at <<http://designfestival.com/visualize-your-data-and-speed-up-your-site-with-dynamic-chart-libraries/>>, Design Festival, Mar. 12, 2012, 12 pages.

Venkatachalam, R., "Playing with Data—Part 2. Data Visualization: Heat Maps," Retrieved Feb. 21, 2013 at <<http://icreate.in/blog/compliance/playing-with-data-part-2-data-visualization-heat-maps>>, iCreate Blog, iCreate Software, Jun. 27, 2012, 6 pages.

"Inbetweening," Retrieved Feb. 26, 2013 at <<http://en.wikipedia.org/wiki/Inbetweening>>, Wikipedia, 3 pages.

"Faceted Browser—Simile," Retrieved Feb. 19, 2013 at <<http://simile.mit.edu/wiki/Faceted_Browser>>, MIT, Nov. 3, 2006, 2 pages.

"Faceted search," Retrieved Feb. 19, 2013 at <<http://en.wikipedia.org/wiki/Faceted_search>>, Wikipedia, 3 pages.

"International Search Report & Written Opinion for PCT Application No. PCT/US2014/020045", Mailed Date: May 15, 2014, Filed Date: Mar. 3, 2014, 13 pages.

"Population Pyramid", Published on: Nov. 12, 2012, 10 pages, Available at: http://lbl.ocks.org/mbostock/4062085.

"General-Purpose Computing on Graphics Processing Units", Published on: Feb. 12, 2013, 12 pages, Available at: http://en.wikipedia.org/w/index.php?title=General-purpose_computing_on_graphics_processing_units&oldid=537797813.

"Elevating JavaScript Performance Through GPU Power", Published on: Oct. 26, 2010, 6 pages, Available at: https://groups.google.com/forum/#!topic/gpu_newbies/dUSIY5XHg3o.

(56) References Cited

OTHER PUBLICATIONS

Klockner, Andreas, "PyCUDA: Even Simpler GPU Programming with Python", Published on: Sep. 22, 2010, 65 pages, Available at: http://mathema.tician.de/dl/main.pdf.
PCT Application No. PCT/US2014/020045, Written Opinion of the International Preliminary Examining Authority, dated Mar. 25, 2015, 9 pages.
PCT Application No. PCT/US2014/020045, Response to Written Opinion of the International Preliminary Examining Authority, dated Apr. 1, 2015, 6 pages.
Erlebacher, et al., "Flow Textures: High Resolution Flow Visualization", Retrieved at <<http://people.sc.fsu.edu/~gerlebacher/home/publications/erle_job_weis_handbook_2003.pdf>> In Handbook of Visualization, Apr. 8, 2003, pp. 24.
"Particle Based Visualizations of Abstract Information", U.S. Appl. No. 13/784,792, filed Mar. 4, 2013, pp. 68.
U.S. Appl. No. 13/784,792, Non-Final Rejection dated Aug. 1, 2014, 18 pages.
U.S. Appl. No. 13/784,792, Amendment dated Feb. 2, 2015, 25 pages.
U.S. Appl. No. 13/784,792, Notice of Allowance dated Feb. 20, 2015, 2 pages.
PCT Application No. PCT/US2014/019765 (foreign counterpart application to U.S. Appl. No. 13/784,792), International Search Report & Written Opinion dated Sep. 16, 2014, 10 pages.
"Compliance Auditor Software Features", Retrieved on: Jul. 30, 2013, Available at: http://www.avatier.com/products/identity-managemenuaccess-governanee/compliance-auditor/features/.
"E-Document Shift", published on Sep. 8, 2011, available at: http://www.intelledox.com/Products/Business-Needs/eDocument-Shift.aspx.
"IT Governance, Risk Management and Compliance", Retrieved on: Jul. 30, 2013, Available at: http://www.tecnocomputacion.com/images/pdf/modulo-riskmanager-overview.pdf.
Colombian Office Action in Application 1652279, dated Mar. 31, 2016, 4 pgs. (without English translation).
European Office Action Issued in European Patent Application No. 14713645.1, dated Mar. 23, 2016, 8 Pages.
European Supplementary Search Report Issued in European Patent Application No. 14713645.1, dated Feb. 29, 2016, 5 Pages.
Fisher, Danyel, "Animation for Visualization: Opportunities and Drawbacks", In Book-Beautiful Visualization: Looking at Data through the Eyes of Experts, Apr. 23, 2010, pp. 329-352.
Ghosh, et al., "Self-healing Systems—Survey and Synthesis", In Journal of Decision Support Systems, vol. 42, Issue 4, Aug. 17, 2006, 22 pages.
Gorla, et al., "Achieving Cost-Effective Software Reliability through Self-Healing", In Journal of Computing and Informatics, vol. 2, Feb. 2010, 22 pages.
Heer, et al., "Animated Transitions in Statistical Data Graphics", In IEEE Transactions on Visualization and Computer Graphics, vol. 13, Issue 6, Nov. 1, 2007, pp. 1240-1247.
Jiang, et al., "A Modeling Framework for Self-Healing Software Systems", In Workshop "Models@ Run. Time" at the 10th International Conference on Model Driven Engineering Languages and Systems, Sep. 2007, 9 pages.
Keromytis, Angelos D., "The Case for Self-Healing Software", Published on: Aug. 24, 2007, Available at: http://www.cs.columbia.edu/-angelos/Papers/2007/self-heal.pdf.
Kharbili, et al., "Towards a Framework for Semantic Business Process Compliance Management", In Proceedings of the Workshop on Governance, Risk and Compliance for Information Systems, Jun. 17, 2008, 15 pages.

King, et al., "Towards Self-Testing in Autonomic Computing Systems", In Eighth International Symposium on Autonomous Decentralized Systems, Mar. 21, 2007, 8 pages.
MacKinlay, Jock, "Automating the Design of Graphical Presentations of Relational Information", In Proceedings of the ACM Transactions on Graphics, vol. 5, Issue 2, Apr. 1, 1986, pp. 110-141.
PCT 2nd Written Opinion in International Application PCT/US2014/053317, dated Sep. 10, 2015, 7 pgs.
PCT International Preliminary Report on Patentability in International Application PCT/US2014/053317, dated Dec. 10, 2015, 7 pgs.
PCT International Preliminary Report on Patentability Issued in PCT Application No. PCT/US2014/056425, dated Dec. 23, 2015, 6 Pages.
PCT International Search Report & Written Opinion in International Application PCT/US2014/053317, dated Nov. 21, 2014, 9 pgs.
PCT International Search Report and Written Opinion Issued in International Application PCT/US2014/056425, dated Dec. 3, 2014, 7 Pages.
PCT International Search Report and Written Opinion Issued in PCT Application No. PCT/US2014/056706, dated Feb. 2, 2015, 11 Pages.
PCT Second Written Opinion Issued in PCT Application No. PCT/US2014/056425, dated Sep. 8, 2015, 5 Pages.
PCT Second Written Opinion Issued in PCT Application No. PCT/US2014/056706, dated Sep. 16, 2015, 6 Pages.
Saha, Goutam Kumar, "Software-Implemented Self-healing System", In CLEI Electronic Journal, vol. 10, Issue 2, Paper 5, Dec. 2007, 6 pages.
Symantec TM Control Compliance Suite, Published on: Sep. 16, 2008, Available at: http://eval.symantec.com/mktg info/enterprise/fact_sheets/b-datasheet_control_compliance_suite_9.0-0611_2008.en-us.pdf.
U.S. Appl. No. 13/784,792, Notice of Allowance dated Jun. 3, 2015, 2 pgs.
U.S. Appl. No. 14/017,088, Amendment and Response filed Apr. 15, 2015, 17 pgs.
U.S. Appl. No. 14/017,088, Notice of Allowance dated May 13, 2015, 17 pgs.
U.S. Appl. No. 14/017,088, Office Action dated Feb. 3, 2015, 21 pgs.
U.S. Appl. No. 14/035,760, Office Action dated May 27, 2015, 22 pgs.
U.S. Appl. No. 14/037,368, Office Action dated Jun. 12, 2015, 26 Pages.
U.S. Appl. No. 14/037,368, Office Action dated Jan. 5, 2015, 29 pgs.
U.S. Appl. No. 14/037,368, Office Action dated Sep. 1, 2015, 34 Pages.
U.S. Appl. No. 14/746,805, Office Action dated Jun. 16, 2016, 16 pgs.
U.S. Appl. No. 14/746,805, Amendment and Response filed Oct. 17, 2016, 28 pgs.
U.S. Appl. No. 14/746,805, Notice of Allowance dated Dec. 5, 2016, 8 pgs.
PCT International Preliminary Report on Patentability Issued In PCT Application No. PCT/US2014/056706, dated Dec. 11, 2015, 6 Pages.
Notice of Allowance Issued in U.S. Appl. No. 14/035,760, dated Sep. 11, 2015, 12 Pages.
Notice of Allowance Issued in U.S. Appl. No. 14/035,760, dated Oct. 16, 2015, 9 Pages.
"First Office Action and Search Report Issued in Chinese Patent Application No. 201480011574.7", dated Apr. 1, 2017, 22 Pages.
"Office Action Issued in European Patent Application No. 14713297.1", dated Jul. 10, 2017, 5 Pages.

\* cited by examiner

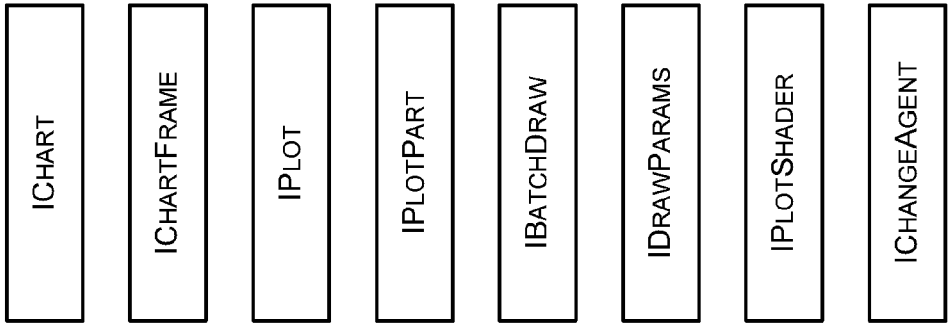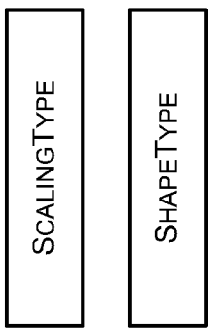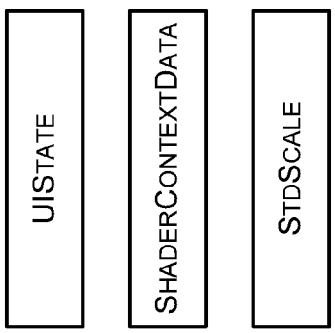
FIG. 3

How a Part is Drawn

GENERATING DATA-MAPPED VISUALIZATION OF DATA

CROSS REFERENCE TO RELATED APPLICATION

This application claims the benefit of U.S. Provisional Application No. 61/772,504, filed Mar. 4, 2013, entitled DATA VISUALIZATION, which application is incorporated herein in its entirety.

BACKGROUND

Visualizing data is becoming increasingly more important. Organizations often have substantial data sets at their disposal, but they lack meaningful ways of visualizing that data. Creating a simple bar chart may be relatively easy with a small data set, but as the data set size increases and the characteristics of data within the data set varies, the task of creating a framework that allows someone to quickly and efficiently visualize the data becomes daunting.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to data visualization. In aspects, a caller sends a request to draw a set of shapes that have a shape type common among the shapes. The request may be for a static drawing or 1 of N animation frames. If the device has a graphical processing unit (GPU) that is available, GPU code is generated for the GPU to draw the set of shapes. Otherwise, CPU code is generated to draw the set of shapes. To enhance performance, the drawing code is tailored to the constant, data-mapped, and animated attribute values specified by the caller and omits conditional statements that test values that are computable prior to drawing the shapes.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

BRIEF DESCRIPTION OF THE DRAWINGS

FIG. 3 generally represents some exemplary data structures, exemplary enumerations, and exemplary interfaces in accordance with aspects of the subject matter described herein;

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions. One exception to the above is where the term "first frame" is used in the claims.

Headings are for convenience only; information on a given topic may be found outside the section whose heading indicates that topic.

Other definitions, explicit and implicit, may be included below.

Exemplary Operating Environment

Figure 1:
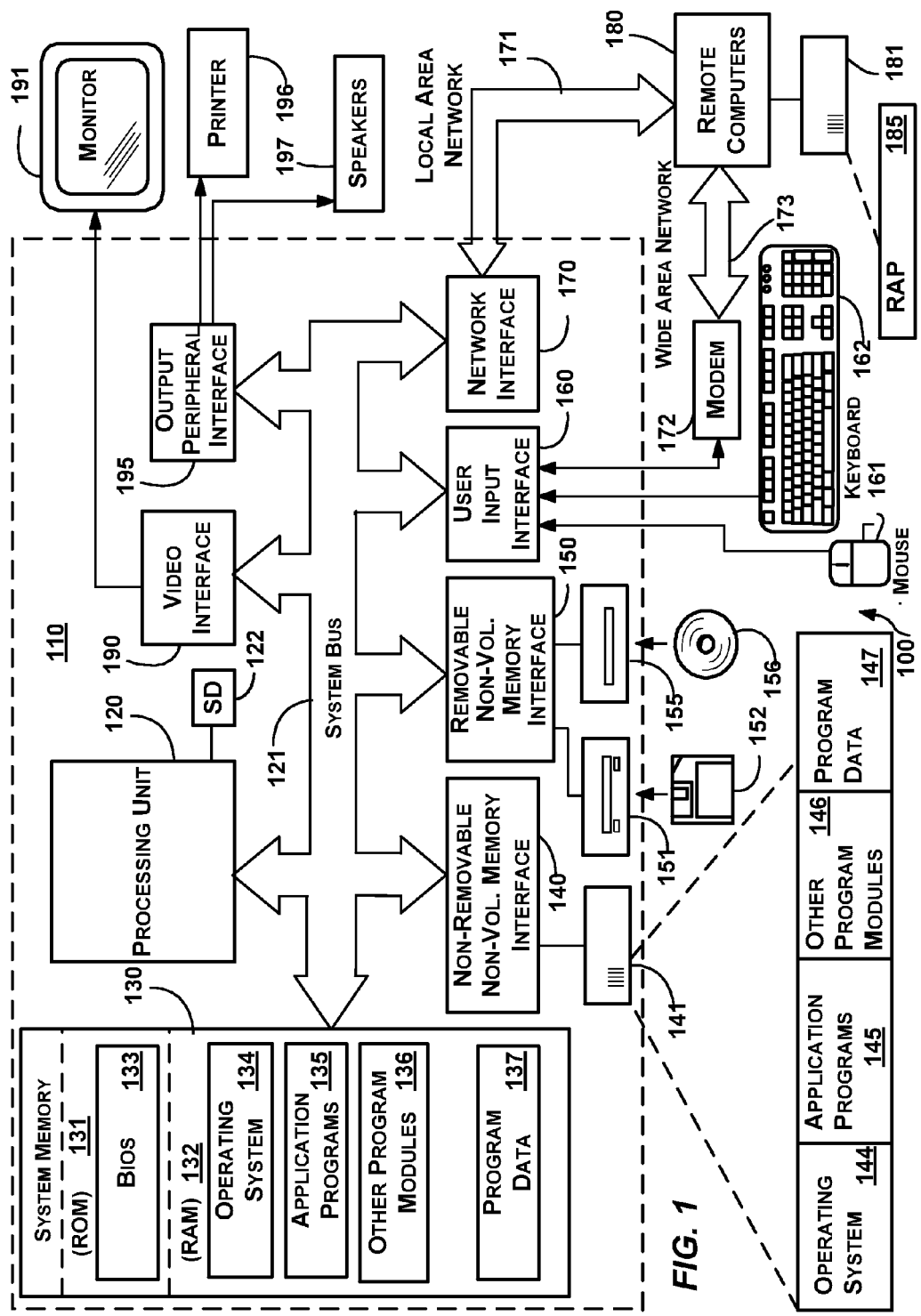
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120 (which may include a central processing unit and, in some systems a graphical processing unit), a system memory 130, and one or more system buses (represented by system bus 121) that couples various system components including the system memory to the processing unit 120. When present a graphical processing unit may be included on a motherboard, a graphical interface card, within the processing unit 120, or elsewhere.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infra-red camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Visualization

Figure 2:
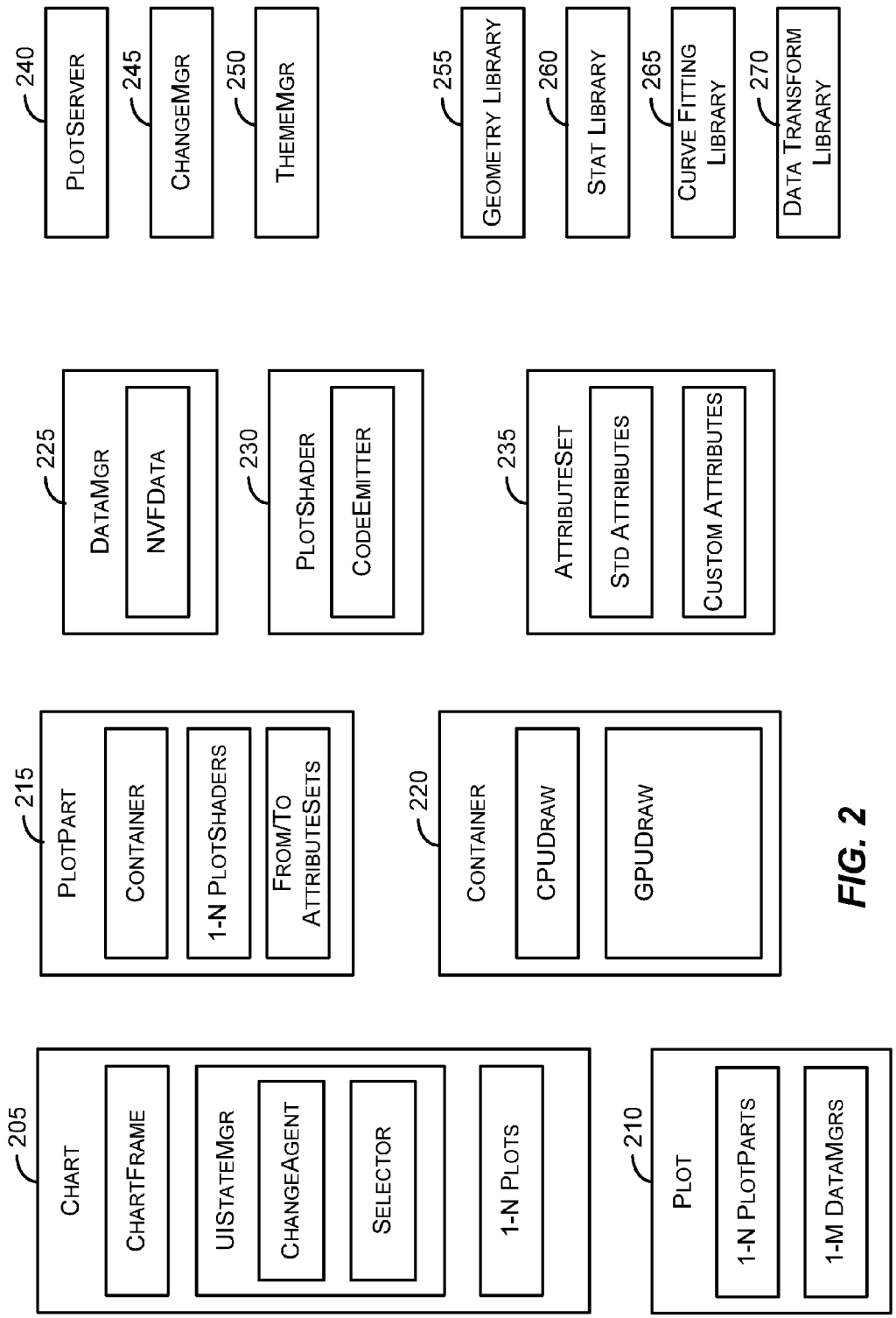
FIG. 2 is a block diagram that generally represents exemplary components in accordance with aspects of the subject matter described herein.

As mentioned previously, creating a framework that allows someone to quickly and efficiently visualize data is challenging. FIG. 2 is a block diagram that generally represents exemplary components in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, mini-computers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

FIG. 2 illustrates some exemplary components including a Chart, Plot, PlotPart, DataMgr, PlotShader, AttributeSet, PlotServer, ChangeMgr, ThemeMgr, Geometry Library, Stat Library, Curve Fitting Library, and Data Transform Library as well as subcomponents of many of these components.

The Chart 205 may include 1-N chart facets. A chart facet includes a ChartFrame and 1-N Plots. Plots within a facet are layered on top of each other. A ChartFrame may include, for example, the axes, title, legends, and gridlines of a chart.

A UIStateMgr is responsible for maintaining the interaction state of each shape. The interaction state may include, for example, hover, selection, filter, and the like. The UIStateMgr may include a ChangeAgent and a Selector.

The ChangeAgent is responsible for sharing the interaction state with different charts. The Selector facilitates selecting shapes by a boundary (e.g., a rubberband type boundary or other boundary (e.g., circle, square, rectangle, or the like)). Selecting shapes can also be done through various other interactions, including mouse, touch, speech, gesture, via a Natural User Interface (as described previously), or the like.

The Plot 210 is a data-driven drawing component that includes 1-N PlotParts and 1-M DataMgrs. Examples of plots include column plots, line plots, box plots, and the like.

The PlotPart 215 (also sometimes called a batch context) is a logical part of a Plot. A PlotPart 215 may be drawn with a single shape type and its own context. For example, a complex shape used in a box plot could be drawn using the following 4 parts: vertical line, box, horizontal line, and outlier points. The PlotPart 215 may include a Container, 1-n PlotShaders, a To Attribute Set, and may include a From Attribute Set. For a single frame drawing, a From Attribute Set may be omitted. When drawing multiple frames for animation, both a From Attribute Set and a To Attribute Set may be provided to perform the animation.

The Container 220 (sometimes called the batch canvas) may include a CPUdraw component and may also include a GPUDraw component. Where the Container 220 is hosted on a computer with a central processing unit, the CPUDraw component is available. When the hosting device also includes a graphical processing unit (e.g., such as found on many graphics cards), the Container 220 may also include a GPUDraw component. The Container 220 may use the CPUDraw component and/or the GRUDraw depending on what is available on the hosting device and the shapes being drawn.

The DataMgr 225 manages sorting and filtering of the current dataset. In addition to maintaining the original format (e.g., JSON), the Datamgr 225 may internally represent the data using NVF format, which is described in more detail below.

The PlotShader 230 adds drawing functionality when drawing a part or a plot. For example, a PlotShader may include a line shader, a bar chart shader, the UI state shader, facet shader, and the like. The PlotShader 230 may also include a default plot shader that performs default shading functionality. The PlotShader 230 may generate constants and emit code (also sometimes called attribute scaling code) that performs various calculations. The code emitter translates the code generated by the PlotShader 230 to a form appropriate for a CPU or GPU depending on available hardware and other conditions. A shader may be cached and re-used.

The AttributeSet 235 includes standard attributes and custom attributes. Some exemplary standard attributes include: x, y, z, size, width, height, color, stroke, opacity, group, uiState, imageIndex, facet, and the like. Some custom attributes may include, for example: randomX, randomY, barIndex, imageIndex, and the like. The custom attributes may be created by the caller or the plot shader. Custom attributes may include data that a shader needs to help compute the value of other attributes. This data may be passed to the shader via the custom attributes.

The PlotServer 240 may run on a server and provide services like reading files, sorting, custom layout that involves server code, and the like. The PlotServer 240 may also manage machine-to-machine change notifications.

Although the terms "client" and "server" are sometimes used herein, it is to be understood, that a client may be implemented on a machine that has hardware and/or software that is typically associated with a server and that likewise, a server may be implemented on a machine that has hardware and/or software that is typically associated with a desktop, personal, or mobile computer. Furthermore, a client may at times act as a server and vice versa. At times, two or more entities that more frequently act as a client or server may concurrently be peers, servers, or clients. In an embodiment, a client and server may be implemented on the same physical machine.

Furthermore, as used herein, each of the terms "server" and "client" may refer to one or more physical or virtual entities, one or more processes executing on one or more physical or virtual entities, and the like. Thus, a server may include an actual physical node upon which one or more processes execute, a virtual node upon which one or more processes execute, a service executing on one or more nodes, a group of nodes that together provide a service, and the like. A service may include one or more processes executing on one or more physical or virtual entities. Furthermore, a single process may implement one or more servers.

The ChangeMgr 245 may execute on a client that renders charts to an output device and may manage notifying subscribers of changes to charts.

The ThemeMgr 250 manages changing between different themes. A theme defines the appearance of a PlotPart, a ChartFrame, or the like. A theme may include color, line width, font, other characteristics, and the like.

The Geometry Library 255 includes geometries of shape types. When asked for a shape type, the Geometry Library 255 may provide data (e.g., a string) that defines the path of the shape.

The Stat Library 260 is used for binning and other statistical functions. When the Stat Library 260 is given a data set, may perform binning or perform some other statistical function as requested.

The Curve Fitting Library 265 provides functions for fitting curves. To use the Curve Fitting Library 265, a data set is passed together with an indication of an order (linear, $2^{nd}$, $3^{rd}$, or of some other order) of a curve to fit.

The Data Transform Library 270 provides functions for transforming data. For example, the Data Transform Library 270 may transform from data from a wide format to a long format. For example, sales data may be represented in a wide format having 4 or more columns: year, profit, sales, and bonus. This same data may be represented in a long format having 3 values: year, case, and value. For example, the wide sales format of year: 1984, profit: 500, sales: 300, bonus: 100 may be represented in long format as Year: 1984, case: profit, value: 500
Year: 1984, case: sales, value: 300
Year: 1984, case: bonus: value, 100.

The Data Transform Library 270 may also perform data smoothing where it does some type of averaging or other smoothing function. The data transform library 270 may also perform grouping and/or other aggregate functions, and sorting transform, filtering, or other database query transforms.

To draw a set of shapes (e.g., a part), the following may be specified:
1. Shape type;
2. Attribute settings
3. Dataset; and
4. A set of one or more plot shaders.

The attribute settings may be as simple as constant values and column name mappings, but may also include scaling methods, and custom scales. For example, a set of shapes may be drawn using the following: SHAPE TYPE=SQUARE, X=SALES, Y=PROFIT, COLOR=BLUE, OPACITY=0.6, SIZE=25, DATASET=SalesTable.

A draw may be done using a batch context or by calling a batch draw engine directly. For multi-faceted charts, all facets of a particular part can be drawn in a single draw call by setting the "facet" attribute to the column defining how records are binned into each facet.

A dataset is a logical set of records, each of which contain 1-N named column values. The drawing engine may accept input datasets in a variety of formats. Datasets may be stored internally in a particular form for high performance in accessing and mapping data.

JSON is a JAVASCRIPT® format for representing named structures of data. JSON is an exemplary format and is used for illustrative purposes. Although JSON is sometimes used herein, there is no intention to limit data representation to JSON formats. Indeed based on the teachings herein, those skilled in the art will recognize many other formats in which data may be represented without departing from the spirit or scope of aspects of the subject matter described herein.

An exemplary dataset may be defined in JSON as follows:

```
var Sales Table =
[
{city: "Los Angeles", sales: 34000, profit: 12300, bonuses: 3000, year: 2001}, {city: "New York", sales: 16500, profit: 0, bonuses: 0, year: 2002}, {city: "Seattle", sales: 21000, profit: 5200, bonuses: 500, year: 2003}, {city: "Phoenix", sales: 15000, profit: -3800, bonuses: 0, year: 2004}, {city: "Boston", sales: 33700, profit: 2500, bonuses: 100, year: 2005}, {city: "Tampa", sales: 5500, profit: 1250, bonuses: 0, year: 2006}, {city: "Orlando", sales: 31000, profit: 18000, bonuses: 4000, year: 2007}, {city: "San Diego", sales: 42500, profit: 22000, bonuses: 4200, year: 2008},

];
```

NVF Format is short for Named Vector Format. In one implementation, NVF format is the internal format of a dataset used by the batch drawing engine. In this format, dataset column values are represented as a vector of FLOAT or INT values, along with pre-computed MIN/MAX values (or MIN/RANGE values) for the column. Non-numeric values are converted to numeric using a value-index scheme. A 2-way index between the records and the non-numeric values may be maintained to enhance the performance of subsequent data transforms. This format enables quick access to the data for any column, along with the ability to scale the data without having to make a subsequent pass over the data to collect min/max values.

Shape type is one of the primitive drawing types supported by the batch draw engine. Predefined shape types include, for example: square, rectangle, line, imageShape, image, and text.

A batch context manages the drawing and animation of a part. A batch context is an abstraction on top of the batch draw engine and is used to implement predefined or custom plots.

The batch draw engine is a shape drawing engine that draws a set of shapes with a common shape type. It has two main methods for drawing: "GPU drawing" and "CPU drawing". GPU stands for graphical processing unit, and it is used, when available, for faster drawing. The fallback, when the GPU is not available, is "CPU drawing". In one embodiment, the batch draw engine draws shapes using the HTML5 Canvas 3D context (WebGL) for "GPU drawing" and using Canvas 2D for "CPU drawing".

An attribute is a logical value used to draw a shape type. Each shape type defines the set of attributes it uses to draw its shape with. In addition, custom attributes can be defined to bring additional data into shaders for calculations with other attributes. Some exemplary attributes include: X, Y, COLOR, OPACITY, and SIZE. An attribute can be set to a constant value (e.g., Color=Blue), or mapped to a data column (e.g., Color=Sales). In addition, most attributes can be animated as shapes are drawn (e.g., Color: from=Blue, to=Sales).

A shader is shape drawing code that is generated by the batch draw engine to run on the CPU or GPU. The generated code may be optimized for the specific constant, mapping, and animation values of each attribute, and for the shape-Type used.

For attribute values calculation, the batch draw engine calls each of the plot shaders to emit code to calculate or adjust the value of one or more attributes.

Plot shaders can choose from a number of standard scaling functions, or emit custom calculations.

FIG. 3 generally represents some exemplary data structures, exemplary enumerations, and exemplary interfaces in accordance with aspects of the subject matter described herein. In TypeScript, one exemplary way of implementing the exemplary data structures is as follows:

```
export enum uiState
{
  normal,         // 0  unselected and no hover
  hover,          // 1
  hoverSelected,  // 2
  selected,       // 3
  filteredOut,    // 4
}
export class shaderContextData
{
  //---- provided by the chart ----
  facetInfo: IFacetInfo;
  preventAnimation: bool;
  //---- provided by uiStateMgr ----
  isSelectionActive: bool;
  isFilterActive: bool;
    // if true, filtered data is used for bounds of current view
  isFilterBoundsActive;
  isHoverActive: bool;
  //---- provided by uiStateMgr ----
  didHoverChange: bool;
  didSelectionChange: bool;
  didFilterChange: bool;
  lastUiStateCol: INvfColumn; // uiState from last draw
  //---- provided by part/batchContext ----
  width: number;   // width of plotarea / facet
  height: number;  // width of plotarea / facet
  isUsingGpu: bool;
  shapeType: batchDraw.shapeType;
  data: INvfData;  // full or facet subset
  count: number;   // # of items in data
  avgSize: number; // average/target size of shapes
  // the shaders for the current part being draw
    shaders: IPlotShader[ ];
  imgSheet: IShapeSheet;
  // index into the color palette for the first uiState color
    uiStateColorIndex: number;
  //---- provided by cpuDraw/gpuDraw ----
  // "From" or "" (the suffix to be added to attribute variables in shader
    ft: string;
  // map of attribute names and their current variable name
    locs: any;
  //--- debug (provided by constructor) ----
  scdId: number;
  constructor( )
  {
    this.scdId = nextScdId++;
  }
}
// used by cpuDraw and gpuDraw to quickly scale attributes.
// data structure only. flat methods access it.
export class stdScaleData
{
  min: number;     // FROM min
  range: number;   // FROM range = max-min
  min2: number;    // TO min
  range2: number;  // TO range = max-min
  //---- these fields only defined for cpuDraw ----
  isDiscreet: bool;
  //isFlipped: bool;
}
```

In TypeScript, one exemplary way of implementing the exemplary enumerations is as follows:

```
export enum shapeType
{
  image,
  imageShape,
  line,
  rectangle,
  square,
}
export enum scalingType
{
  none,
  linear,
  linearFlip,
  linearSize,
  category,
  categoryCluster,
}
```

In TypeScript, one exemplary way of representing the exemplary interfaces is as follows:

```
export interface IChart
{
  parent( ): HTMLElement;
  parent(value: any): IChart;
  autoRedraw( ): bool;
  autoRedraw(value: bool): IChart;
  chartFrame( ): frameControls.IChartFrame;
  setFacets(data: batchDraw.INvfData, colName: string, binCount: number);
  clearFacets( );
  batchContainer( ): batchDraw.IContainer;
  // set size of drawing container (same as chart size).
  // setContainerSize(width: number, height: number);
  // set size of total chart area
  // (might include ribbon, status line, other decorations).
  // set size of total chart (ribbon + plot area)
  setTotalChartSize(width: number, height: number);
  // if an HTML element completely covers the chart,
  // set it here so chart can do proper event testing.
  // setElementThatCoversChart(topMost: HTMLElement);
  erase( );
  drawChart(preventAnimation?: bool, isHoverDraw?: bool);
  addLayer(plot: IPlot);
  getLayer(num: number): IPlot;
  clearLayers( );
  getPlotBounds( ): ClientRect;
  markDrawNeeded( );
  uiStateMgr( ): plotServices.IUIStateMgr;
  isChartDrawing( ): bool;
  getDrawCount( ): number;
  //---- events ----
  attachOnChartDrawingCompleted(callback: any);
}
```

```
export interface IChartFrame
{
  //---- methods ----
  buildFrame(root, frameMargins: frameControls.marginsData,
             borderSize: number);
  //---- properties ----
  title( ): string;
  title(value: string): IChartFrame;
  showGridLines( ): bool;
  showGridLines(value: bool): IChartFrame;
  showLegend( ): bool;
  showLegend(value: bool): IChartFrame;
  showTitle( ): bool;
  showTitle(value: bool): IChartFrame;
  showPlotBorder( ): bool;
  showPlotBorder(value: bool): IChartFrame;
  showLeftAxis( ): bool;
  showLeftAxis(value: bool): IChartFrame;
  showTopAxis( ): bool;
  showTopAxis(value: bool): IChartFrame;
  showRightAxis( ): bool;
  showRightAxis(value: bool): IChartFrame;
  showBottomAxis( ): bool;
  showBottomAxis(value: bool): IChartFrame;
  showLeftLabel( ): bool;
  showLeftLabel(value: bool): IChartFrame;
  showTopLabel( ): bool;
  showTopLabel(value: bool): IChartFrame;
  showRightLabel( ): bool;
  showRightLabel(value: bool): IChartFrame;
  showBottomLabel( ): bool;
  showBottomLabel(value: bool): IChartFrame;
  xScale( ): any;
  xScale(value: any): IChartFrame;
  yScale( ): any;
  yScale(value: any): IChartFrame;
  attributeScales( ): any;
  attributeScales(value: any): IChartFrame;
  //---- readonly properties ----
  plotAreaBounds( ): ClientRect;
  isVisible( ): bool;
  isVisible(value: bool): IChartFrame;
}
export interface IPlot extends batchDraw.IBatchContext
{
  //drawShapes(info: IDrawInfo);
  parent( ): IChart;
  parent(value: IChart): IPlot;
  getImageSheetCallback( ): any;
  getImageSheetCallback(value: any): IPlot;
  attachOnLayerDrawingCompleted(callback: any );
  isLayerDrawing( ): bool;
}
// this is the interface known as "IPlotPart" in FIG. 3.
export interface IBatchContext extends IAttributesPlus
{
  //---- methods ----
  draw(shaderContextData: batchDraw.shaderContextData);
  //buildToAttrDataAndScale(facetInfo: IFacetInfo);
  drawNextChunk(firstCall: bool);
  getPixels(x: number, y: number, w: number, h: number): any;
  getCanvasUrl( ): string;
  calcUiStateIndex( );
  cancelDrawing( );
  addChangedAttributeToFrom(attrName, currValue, newValue, forceAdd?: bool): bool;
  deleteHitTestMap( );
  buildAxisScales(scd: batchDraw.shaderContextData);
  finishToAndFromAttributes(scd: batchDraw.shaderContextData);
  validateAttributes( );
  // build a hit-testing map for the shapes drawn in the previous draw call.
  buildHitTestMap(firstCall: bool);
  attachOnPartDrawingCompleted(callback: (was3d: bool, wasAnimated: bool,
      fps: number) => void );
  attachOnStatsChanged(callback);
  attachOnDataChanged(callback);
  //---- properties ----
  shapeType( ): batchDraw.shapeType;
  shapeType(value: batchDraw.shapeType): IBatchContext;
  isAnimationEnabled( ): bool;
```

```
isAnimationEnabled(value: bool): IBatchContext;
isHitTestingEnabled( ): bool;
isHitTestingEnabled(value: bool): IBatchContext;
//defaultColorPalette( ): any[ ];
//defaultColorPalette(value: any[ ]): IBatchContext;
imageSheet( ): batchDraw.IShapeSheet;
imageSheet(value: batchDraw.IShapeSheet): IBatchContext;
propertyChangedCallback( ): (propName: string, value: any) => void;
propertyChangedCallback(value: (propName: string, value: any) => void ):
    IBatchContext;
data( ): batchDraw.INvfData;
data(value: any): IBatchContext;
shaders( ): batchDraw.IPlotShader[ ];
shaders(value: batchDraw.IPlotShader[ ]): IBatchContext;
animationInterval( ): number;
animationInterval(value: number): IBatchContext;
container( ): batchDraw.IContainer;
container(value: batchDraw.IContainer): IBatchContext;
xScale( ): batchDraw.IAxisScale;
xScale(value: batchDraw.IAxisScale): IBatchContext;
yScale( ): batchDraw.IAxisScale;
yScale(value: batchDraw.IAxisScale): IBatchContext;
//---- readonly properties ----
toAttributes( ): batchDraw.attributeSet;
fromAttributes( ): batchDraw.attributeSet;
uiStateColFrom( ): batchDraw.INvfColumn;
isPartDrawing( ): bool;
lastDrawWasAnimated( ): bool;
lastDrawFps( ): number;
}
/// this is a part of the interface to the shape drawing engine.
export interface ICamera
{
 // zoom the current view by the relative "factor",
 // with the zoom center at screenX, screenY.
    adjustZoom(factor: number, screenX: number, screenY: number): void;
 // pan the current view by deltaX, deltaY.
    adjustPan(deltaX: number, deltaY: number): void;
 // reset pan and zoom to their default values.
    resetPanAndZoom( ): void;
 // update camera when screen size changes.
    updateScreenSize(width: number, height: number): void;
}
// this is the interface to the shape drawing engine.
export interface IBatchDraw extends ICamera
{
 getPixels(x: number, y: number, w: number, h: number): any;
 // draw a single (non-animated) frame.
 drawFrame(toAttribs: attributeSet, offset: number, count: number,
   maxTimeSlice: number, scd: shaderContextData): number;
 // draw first frame on an animation.
 drawFirstAniFrame(fromAttribs: attributeSet, toAttribs: attributeSet,
    count: number, maxTimeSlice: number, fromScd: shaderContextData,
           scd: shaderContextData): number;
 // draw next frame of an ongoing animation.
 drawNextAniFrame(percent: number, maxTimeSlice: number): number;
 // build the info needed to do subsequent "hitTestPoint( )"
 // and "hitTestRect( )" calls.
 buildHitTestMap(toAttribs: attributeSet, offset: number, count: number,
    timeSlice: number, rowIndexData: any, additive: bool,
           scd: shaderContextData): number;
 // delete the data (and free space) used for hit testing.
 deleteHitTestMap( ): void;
 // return the dataRow index of the topmost shape at x,y.
 hitTestPoint(x: number, y: number): number[ ];
 // return the row indexes for the shapes found in the specified rectangle.
 hitTestRect(rc: ClientRect): number[ ];
 // return the CPU function or GPU shader used to draw the last batch of shapes.
 getShaderText(was3dDraw, getFragShader: bool): string;
 showPickMap( ): bool;
 showPickMap(value: bool): IContainer;
 showPickMap(value?: bool): any;
}
export interface IDrawParams
{
 layoutType: layoutType;
 bins: IBinInfo[ ];
 facetInfo: IFacetInfo;
 //---- Turn off animations when a shapeType change is involved ----
```

-continued

```
 shapeType: shapeType;
 //---- Use a single imageSheet to hold both FROM and TO color images ----
 //---- this allows the GPU side to use a single texture and sampler (easier code). ----
 imageSheet: IShapeSheet;
 rowIndexData: any;
}
export interface IPlotShader
{
 name( ): string;
 getParamSettings?( ): string;
 mapAttributes(scd: batchDraw.shaderContextData, attrSet: attributeSet,
    attrMap: { [index: string]: batchDraw.attributeMapItem; }): void;
 emitConstants(scd: batchDraw.shaderContextData, emitter: ICodeEmitter): void;
 emitScalingCode(scd: batchDraw.shaderContextData, emitter: ICodeEmitter): void;
}
export interface IChangeAgent
{
 //---- methods ----
 unregister( );
 //---- properties ----
 data( ): any;
 data(value: any): IChangeAgent;
 shareName( ): string;
 appName( ): string;
 processId( ): string;
 externalShare( ): bool;
 viewName( ): string;
 dataChangedCallback( ): any;
}
```

Below are some other exemplary interfaces that may be useful that are also represented using TypeScript.

```
// This implements chaining properties on a single attribute and is the primary
// interface to attributes via IBatchContext, IPlot, or IChart.
// Only the external properties are exposed thru this interface. For internal operations,
// the attributes are accessed using their class directly (attributeInfoClass).
export interface IAttributeInfo
{
 name( ): string;
 colName( ): string;
 colName(value: string): IAttributeInfo;
 constant( ): any;
 constant(value: any): IAttributeInfo;
 customPalette( ): any[ ];
 customPalette(value: any[ ]): IAttributeInfo;
 customScale( ): stdScaleData;
 customScale(value: stdScaleData): IAttributeInfo;
 scaling( ): scalingType;
 scaling(value: scalingType): IAttributeInfo;
 isDefaultSettings( ): bool;
 isValueSet( ): bool;
 clone( ): IAttributeInfo;
 pop( ): IAttributesPlus;   // returns the parent of the attribute
}
export interface IAttributesPlus
{
 //---- these are the predefined attributes, supporting the predefined shapeTypes ----
 x( ): IAttributeInfo;
 x(value: any): IAttributesPlus;
 y( ): IAttributeInfo;
 y(value: any): IAttributesPlus;
 z( ): IAttributeInfo;
 z(value: any): IAttributesPlus;
 size( ): IAttributeInfo;
 size(value: any): IAttributesPlus;
 width( ): IAttributeInfo;
 width(value: any): IAttributesPlus;
 height( ): IAttributeInfo;
 height(value: any): IAttributesPlus;
 color( ): IAttributeInfo;
 color(value: any): IAttributesPlus;
 stroke( ): IAttributeInfo;
 stroke(value: any): IAttributesPlus;
 opacity( ): IAttributeInfo;
 opacity(value: any): IAttributesPlus;
```

```
imageIndex( ): IAttributeInfo;
imageIndex(value: any): IAttributesPlus;
group( ): IAttributeInfo;
group(value: any): IAttributesPlus;
// not exposed to external code.
//facet( ): IAttributeInfo;
//facet(value: any): IAttributesPlus;
uiState( ): IAttributeInfo;
uiState(value: any): IAttributesPlus;
}
```

There may be charts running in the same page, running in different applications (including one or more browsers or other applications), or even on different machines. A changeMgr component may pass along change notifications between chart instances. The changeMgr component may have a related server implementation that it uses when needed. For example, the changeMrg component may be used to synchronize uiState information among charts enlisted in the same share channel.

For example, the changeMgr component may be used to share change information between in-process and external/networked views. For a concrete example, assume that there is an HTML based charting application called "xPlot". The charting application operates on one set of data tables at a time but offers multiple views of that data. Each view in xPlot may perform a call such as:

var changeAgent=vp.changeMgr.registerView(shareName, appName, externalShare, on ChangedFunc);

The parameter "shareName" is the name of the shared data. Multiple channels of sharing can be established within or between applications using different names.

The parameter "appName" is the friendly name of the application being run. In the example above, "appName" would be "xPlot".

The parameter "externalShare" controls whether or not the sharing extends outside of the current machine. If "externalShare" is set to "true", the ChangeService (running on the hosting server) will be used to relay data between sharing clients.

The parameter "on ChangedFunc" is a callback function that is called by the changeMgr whenever a change agent has signaled that something has changed. Views may close or rebuild themselves according to the data in the changeAgent.data property.

The "data" that is being shared (e.g., changeAgent.data) may be anything, but in JAVASCRIPT® and similar implementations, it may be a JSON object that holds properties of the data (e.g., data source name, selection query, filter query, highlight query, or the like).

Whenever something in the "data" is changed by a view, the view may avoid updating the associated view elements directly and instead use "changeAgent.ChangeData( )" to do so, and then wait for the callback to be called before updating the view.

In TypeScript, one exemplary way of implementing an exemplary interface of the changeMgr is as follows:

```
export interface IChangeMgr
{
  register(agent: IChangeAgent);
  unregister(agent: IChangeAgent);
}
```

FIGS. 4-16 are flow diagrams that generally represent exemplary actions that may occur in accordance with aspects of the subject matter described herein. For simplicity of explanation, the methodology described in conjunction with FIGS. 4-16 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Based on the teachings herein, most of the actions described in the FIGS. 4-16 will be readily understandable by those skilled in the art. For further information, some actions in FIGS. 4-16 will be called out and described in more detail below.

Figure 4:
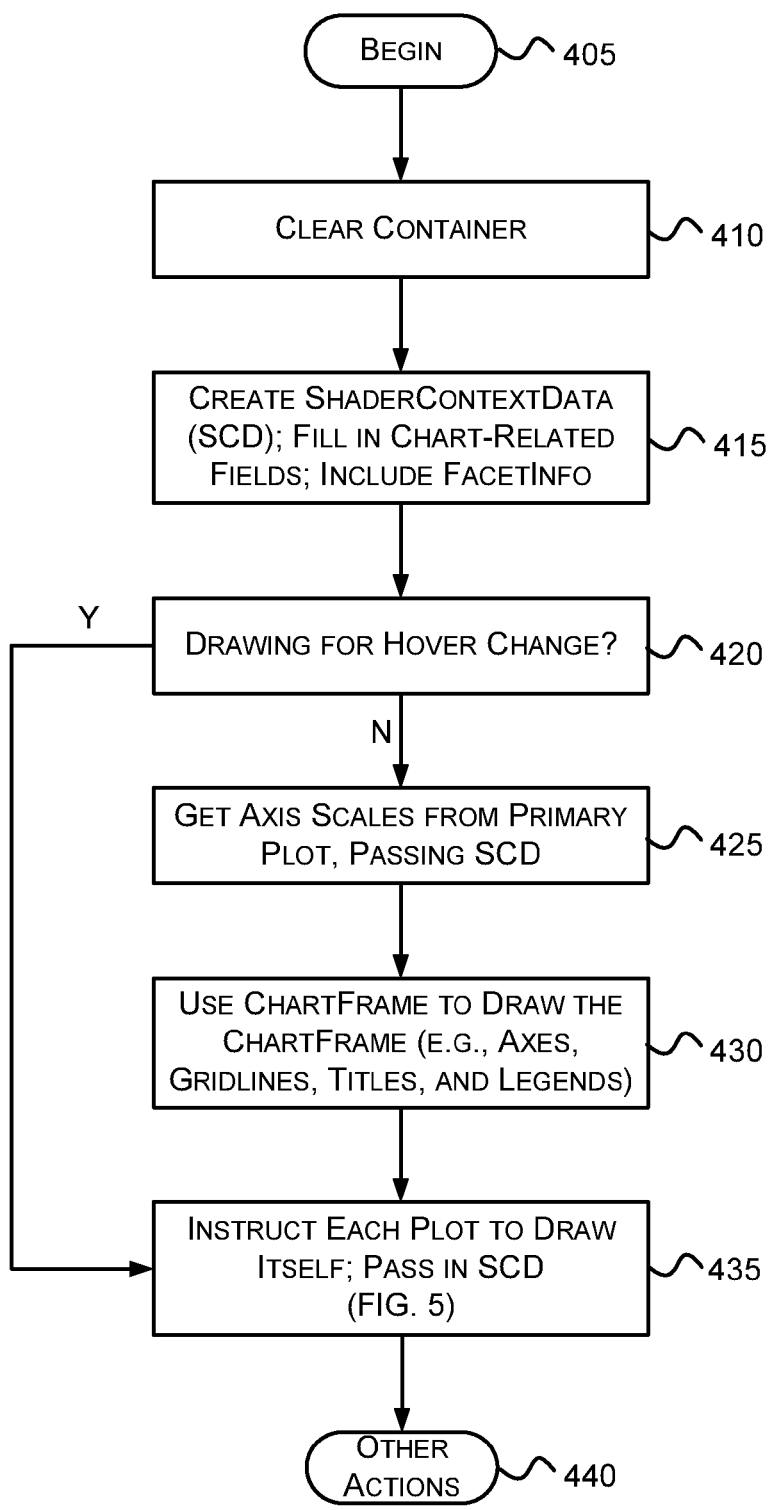
FIGS. 4-14 are flow diagrams that generally represent exemplary actions that may occur in accordance with aspects of the subject matter described herein.

Turning to FIG. 4, at block 405, the actions begin. At block 410, a container (e.g., drawing surface or data structure) is cleared. At block 415, context data is created and chart-related fields are filled in. At block 415, facet information, if any, and UI state related information is also filled in. At block 420, if the change is a hover change, the actions of blocks 425-430 may be skipped. This speeds the rendering which may be noticeable when a user is performing hovering input.

At block 425, axis scales are obtained from the primary plot by providing the context data to a drawing component. At block 430, the chart frame code is used to draw the frame of a chart (e.g., axes, gridlines, titles, legends, and so forth). At block 435 each plot is instructed to draw itself (as described in more detail in FIG. 5) and is provided with the context data. At block 440, other actions, if any, may be performed.

Figure 5:
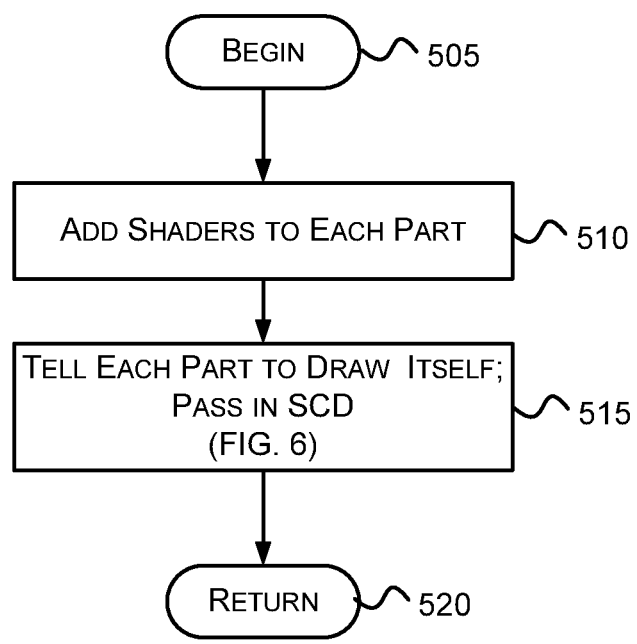

Turning to FIG. 5, certain shaders may be associated with certain parts. If a batch of shapes includes a certain part, then the shader may be added. A default shader may be available to handle any attributes not handled by other shaders. The default shader provides standard scaling variables and code for each attribute it supports.

A UI State shader takes care of hover and selection color and hiding shapes that are filtered out. A facet shader breaks up a single plot into 1 or more "facets", a plot based on a value or range of values for an attribute.

When the GPU or CPU shader code is being generated, the batch draw engine asks each plot shader which attributes it wants to own or contribute to. If a plot shader owns an attribute, then the plot shader is responsible for generating the scaling and constant generation code. If a plot shader contributes to an attribute, the plot shader will emit code to adjust the value of an attribute.

At block 505, the actions begin. At block 510, shaders are added to each part. At block 515, an instruction is sent to each part to draw itself. Context data is passed to the part. At block 520, the action return and continue at block 440 of FIG. 4.

Figure 6:
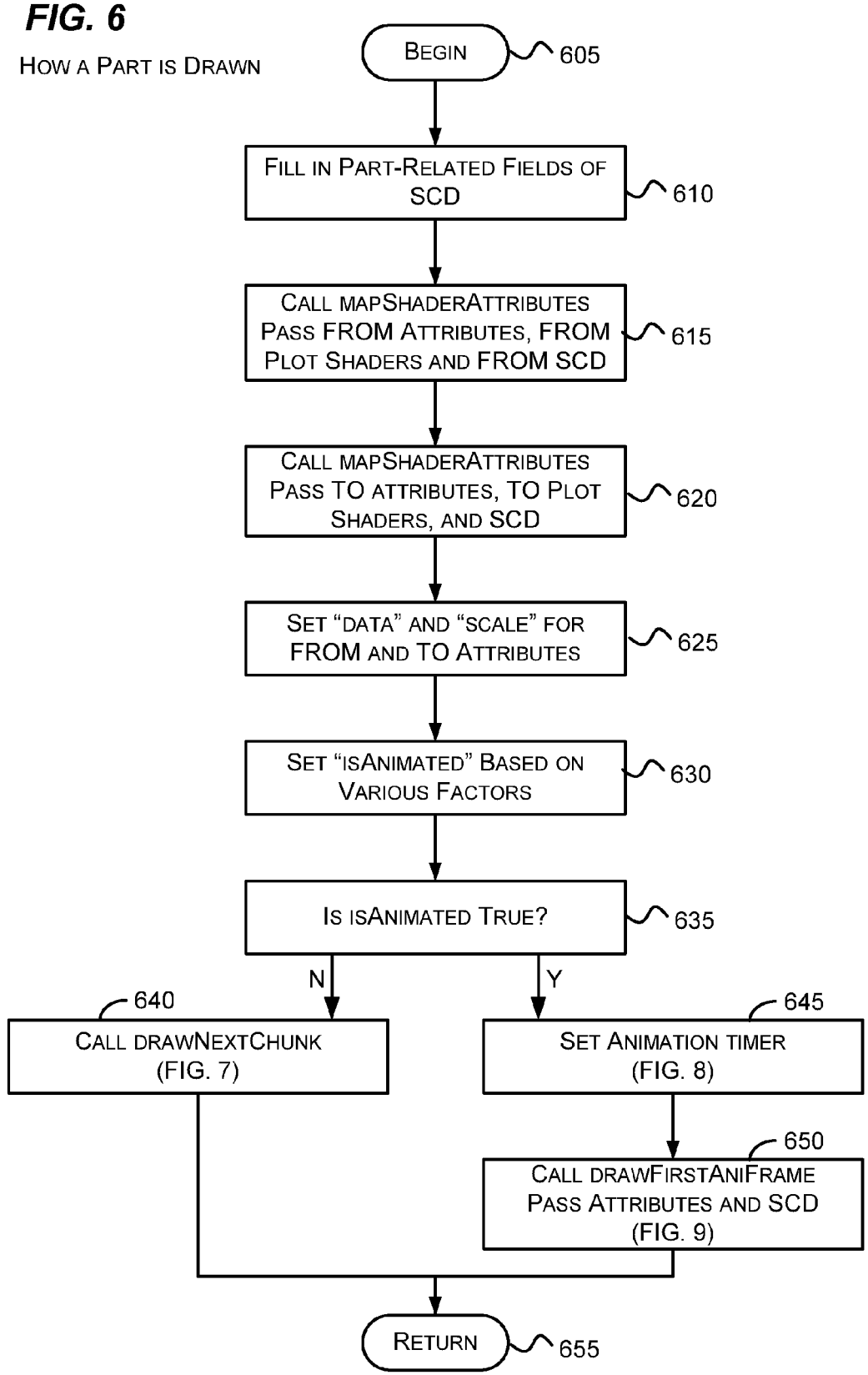

Turning to FIG. 6, at block 605, the actions begin. At block 610, part-related fields are filled-in in the context data. At block 615, mapShaderAttributes is called passing FROM attributes, FROM plot shaders, and FROM context data. At block 620, mapShaderAttributes is called passing TO attributes, TO plot shaders and context data.

At block 625, a pointer to the data in NVF format may be obtained from a given data set together with scaling information. The "data" and "scale" may be set for the FROM and TO attributes.

At block 630, is Animated is set based on various factors. Some exemplary factors include: presence of FROM attributes (if found this indicates animation may be needed) and absence of any animation-preventing changes. In addition, other factors include determining if anything has changed from the last drawing that will create a visual difference.

At block 635, if is Animated is true, the actions continue at block 645; otherwise, the actions continue at block 640.

Figure 7:
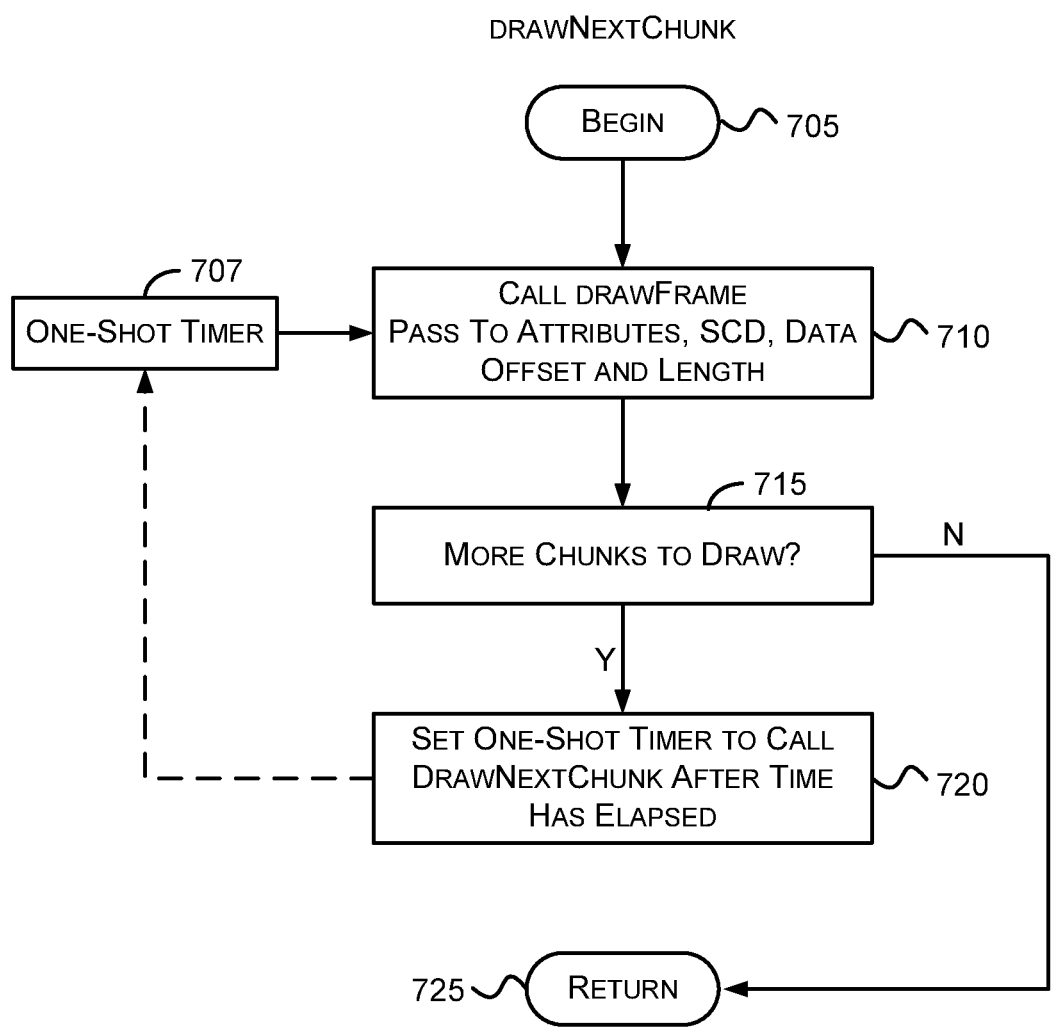

At block 640, the actions associated with FIG. 7 are performed. At block 645, an animation timer is set as described in more detail in conjunction with FIG. 8. At block 650, the first animation frame is drawn as described in more detail in conjunction with FIG. 9. At block 655, the actions continue after an action that called the actions of FIG. 6.

Turning to FIG. 7, this applies when a static frame drawing (as compared to animation) is performed. Large sets of shapes (e.g., 1 million+) can be drawn in chunks up to a maximum specified shape count, intermixed with a short period of idle time (e.g., 500 ms), allowing the UI to remain responsive while drawing the large set. In addition to chunking, because it is sometimes hard to predict the maximum shape count that can be drawn in a responsive time, a CPU timer may also be used to limit the time spent in each drawing call. If the CPU timer expires before a chunk is drawn, this may stop the drawing of the current chunk and cause the actions to continue at block 715.

At block 705, the actions begin. At block 710 drawFrame is called passing TO attributes, context data, offset, and length. At block 715, if there are more chunks to draw, the actions continue at block 720; otherwise, the actions continue at block 725. At block 720, a timer is set to call drawNextChunk after a period of time has elapsed. At block 707, after the timer has elapsed, the actions continue at block 710. At block 725, the actions continue after an action that called the actions of FIG. 7.

Figure 8:
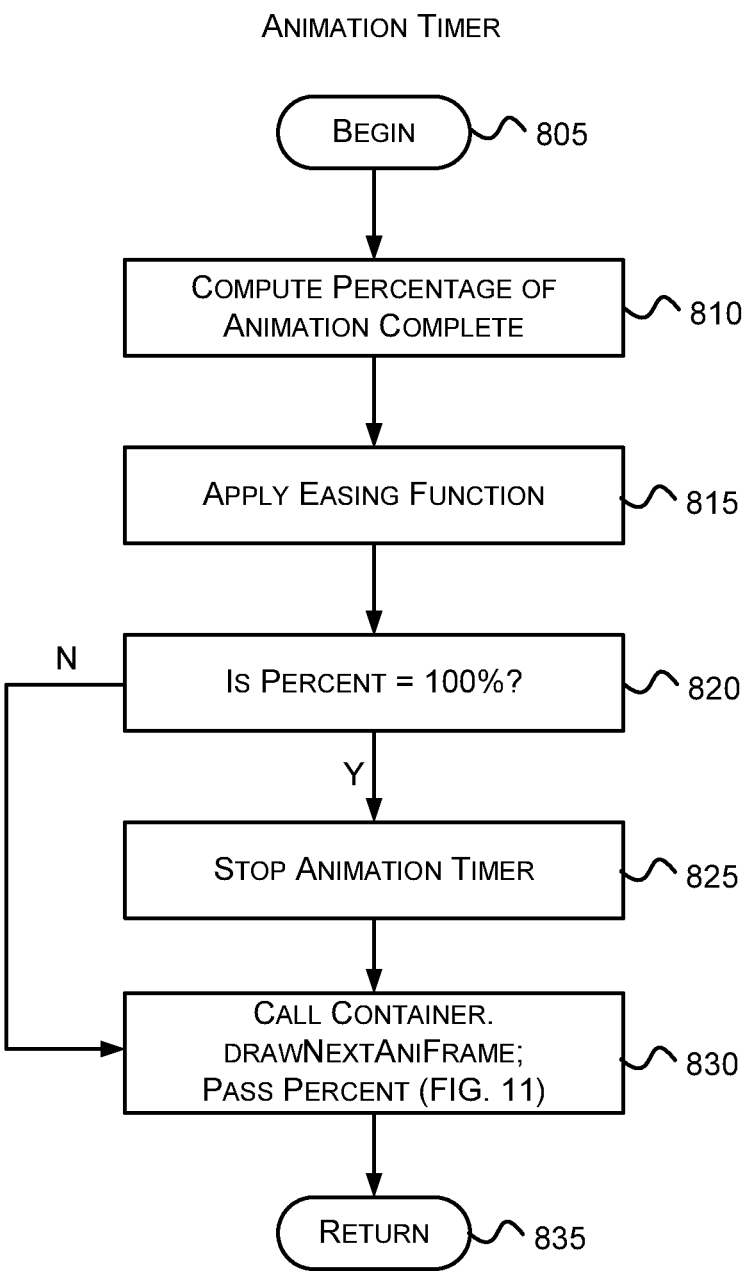

Turning to FIG. 8, the actions begin at block 805. At block 810, the percentage of animation complete is computed.

At block 815, an easing function may be applied. The easing function may transform a linear animation, by adjusting the "percent" value used to draw each frame in the animation. Without the easing function, the "percent" value varies linearly with the accumulated time since the animation began. The easing function provides an opportunity to change this, usually based on an "in" and an "out" point, near the beginning and end of the animation.

For example, when starting and ending an animation sequence, a delay may be introduced that is reduced as frames are initially displayed and then increased near the end of the animation sequence. This delay may be introduced, for example, to add smoothness to the animation as it begins. In one implementation, the easing function is a log function.

At block 820, if the percentage is 100%, the actions continue at block 825; otherwise, the actions continue at block 830.

At block 825, the animation timer is stopped.

Figure 11:
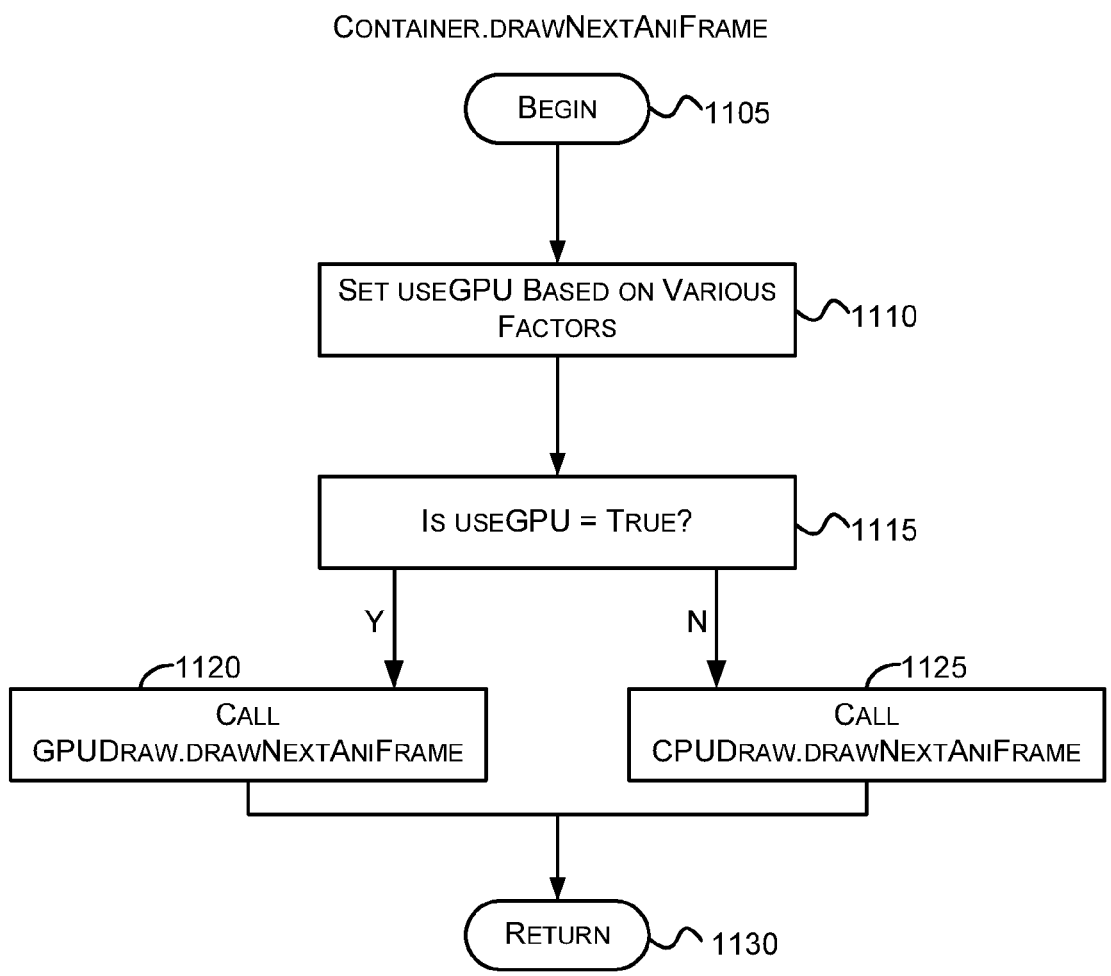

At block 830, the next animation frame is drawn as described in more detail in conjunction with FIG. 11. At block 835, the actions continue after an action (e.g., of another figure) that called the actions of FIG. 8.

Figure 9:
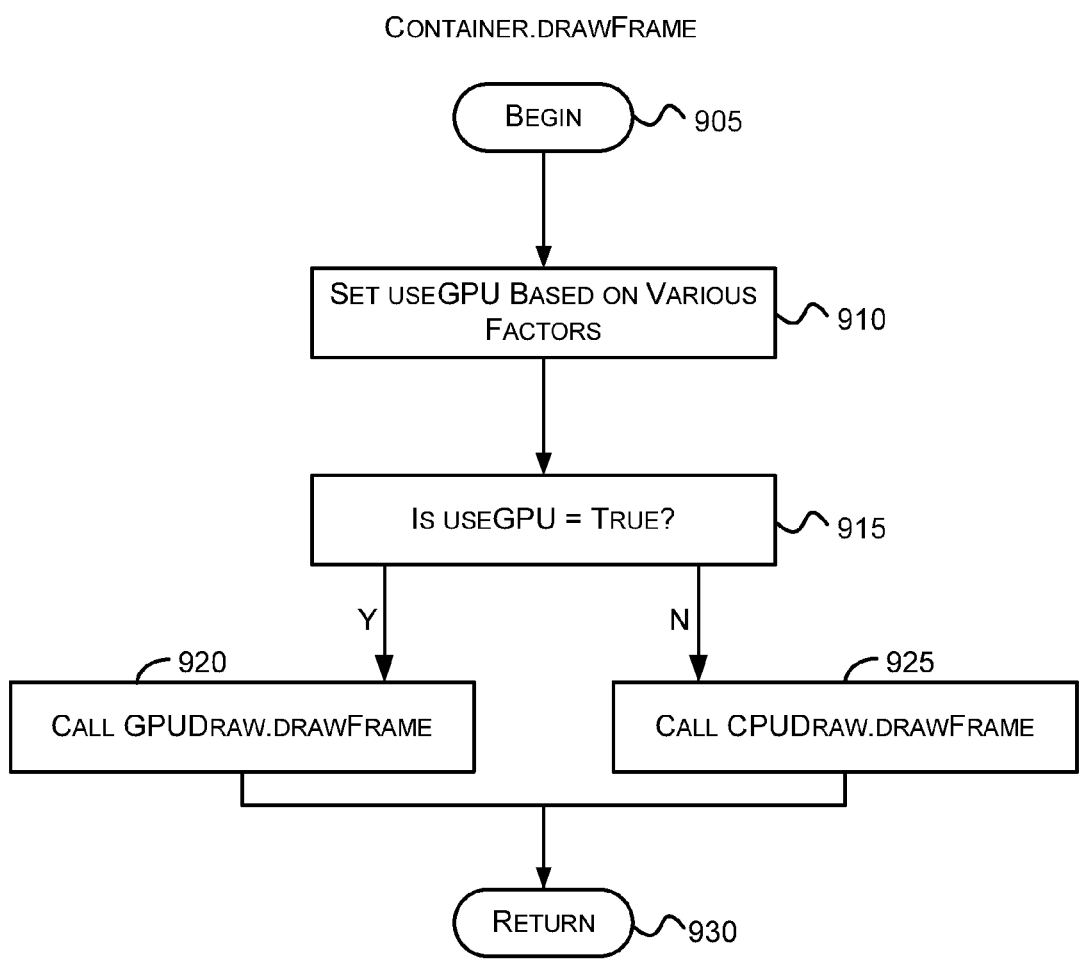
Figure 10:
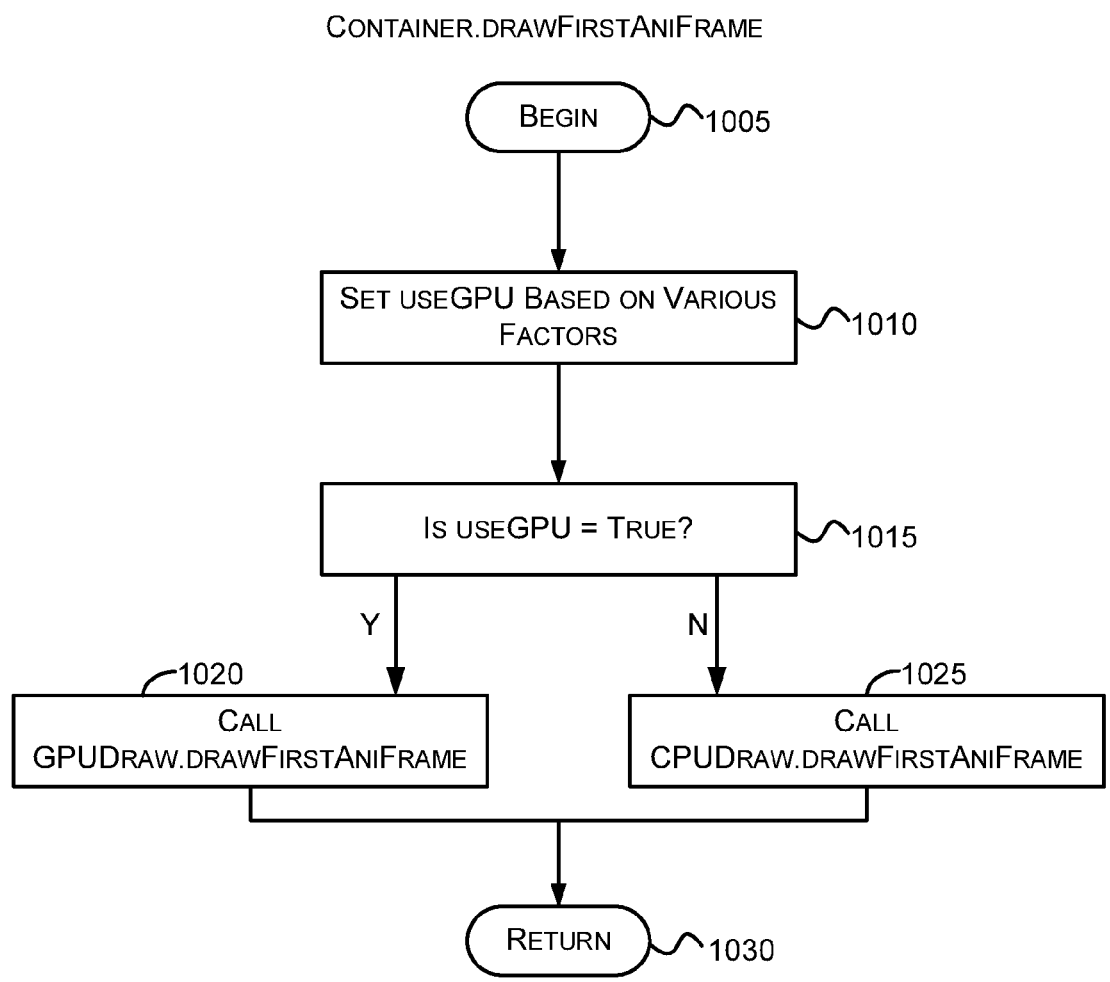

With reference to FIGS. 9 and 10, the various factors indicated at blocks 910 and 1010 may include, for example, whether a graphical processing unit (GPU) is available, enabled, and capable of drawing the current batch of shapes (e.g., based on ShapeType and settings of TO attributes). For animation, once it is determined to use CPUDraw or GPUDraw, this determination may remain in effect until the end of the animation.

The actions of FIGS. 4-14 may be performed in response to a caller (e.g., an application program or other process) sending a request to draw a set of shapes. The request is received as an interface of a batch shape drawing engine. The shapes have a shape type that is common among the shapes. There are a certain number of the shapes and this number is indicated in the request. The shapes have constant and data-mapped attribute values that are indicated by the request and that are to be used in drawing the shapes.

In response to a request by a caller to draw the set of shapes, in one implementation, the caller may receive an indication that at least some of the shapes have been drawn. For example, if time slicing is enabled and CPU drawing is being performed, the graphics drawing framework may draw the shapes in chunks so that the system may remain responsive to user input.

Turning to FIG. 9, at block 905, the actions begin.

At block 910, a variable (e.g., useGPU) is set based on various factors as described previously.

At block 915, if the variable (e.g., useGPU) is true, the actions continue at block 920; otherwise, the actions continue at block 925.

At block 920, GPUDraw.drawFrame is called. When GPUDraw.drawFrame is called, GPU code is generated that is suitable for the GPU to draw the set of shapes specific to the constant and data-mapped attribute values specified by the caller. This may be done as has been described elsewhere herein. The GPU code may omit any conditional statements that test values that are known or knowable prior to drawing the shapes. For example, a conditional statement that tests the shape type may be omitted because the shape type is known. A "knowable" value is one that can be computed prior to drawing the shapes.

For example, to scale a number, the number may be multiplied by another number. The product may be computed prior to drawing. As another example, a loop may be unrolled and the loop checking code (e.g., a conditional statement) may be omitted. These examples are not intended to be all-inclusive or exhaustive. Indeed, based on the teachings herein, those skilled in the art may recognize other examples of where conditional statements may be omitted without departing from the spirit or scope of aspects of the subject matter described herein.

At block 925, CPUDraw.drawFrame is called. When CPUDraw.drawFrame is called, CPU code is generated that is suitable for the CPU to draw the set of shapes specific to the constant and data-mapped attribute values specified by the caller. This may also be done as has been described elsewhere herein. Furthermore, the CPU code may also omit any conditional statements that test values that are knowable prior to drawing the shapes.

At block 930, the actions continue after an action (e.g., of another figure) that called the actions of FIG. 9.

Turning to FIG. 10, at block 1005, the actions begin. At block 1010, a variable (e.g., useGPU) is set based on various factors as described previously. At block 1010, if the variable (e.g., useGPU) is true, the actions continue at block 1020; otherwise, the actions continue at block 1025. At block 1020, GPUDraw.drawFirstAniFrame is called. At block 925, CPUDraw.drawFirstAniFrame is called. At block 1030, the actions continue after an action (e.g., of another figure) that called the actions of FIG. 10.

Turning to FIG. 11, at block 1105, the actions begin. At block 1110, a variable (e.g., useGPU) is set based on various factors as described previously. At block 1115, if the variable (e.g., useGPU) is true, the actions continue at block 1120; otherwise, the actions continue at block 1125. At block 1120, GPUDraw.drawNextAniFrame is called. At block 925, CPUDraw.drawNextAniFrame is called. At block 1130, the actions continue after an action (e.g., of another figure) that called the actions of FIG. 11.

With reference to any figure that references CPUDraw.drawFrame, this method may perform actions including:

1. Generating CPU "shader code" by calling emitDrawFrame( ), passing toAttributes, SCD, and TimeSlice data; and
2. Calling the generated shader code, passing in toAttributes, offset, count, and TimeSlice data.

With reference to any figure that references CpuDraw.drawFirstAniFrame, this method may perform actions including:

1. Generating CPU "shader code" by calling emitDrawFrame( ), passing fromAttributes, toAttributes, fromSCD, SCD, and TimeSlice data; and
2. Calling the generated shader code, passing in fromAttributes, toAttributes, offset, count, and TimeSlice data.

Figure 12:
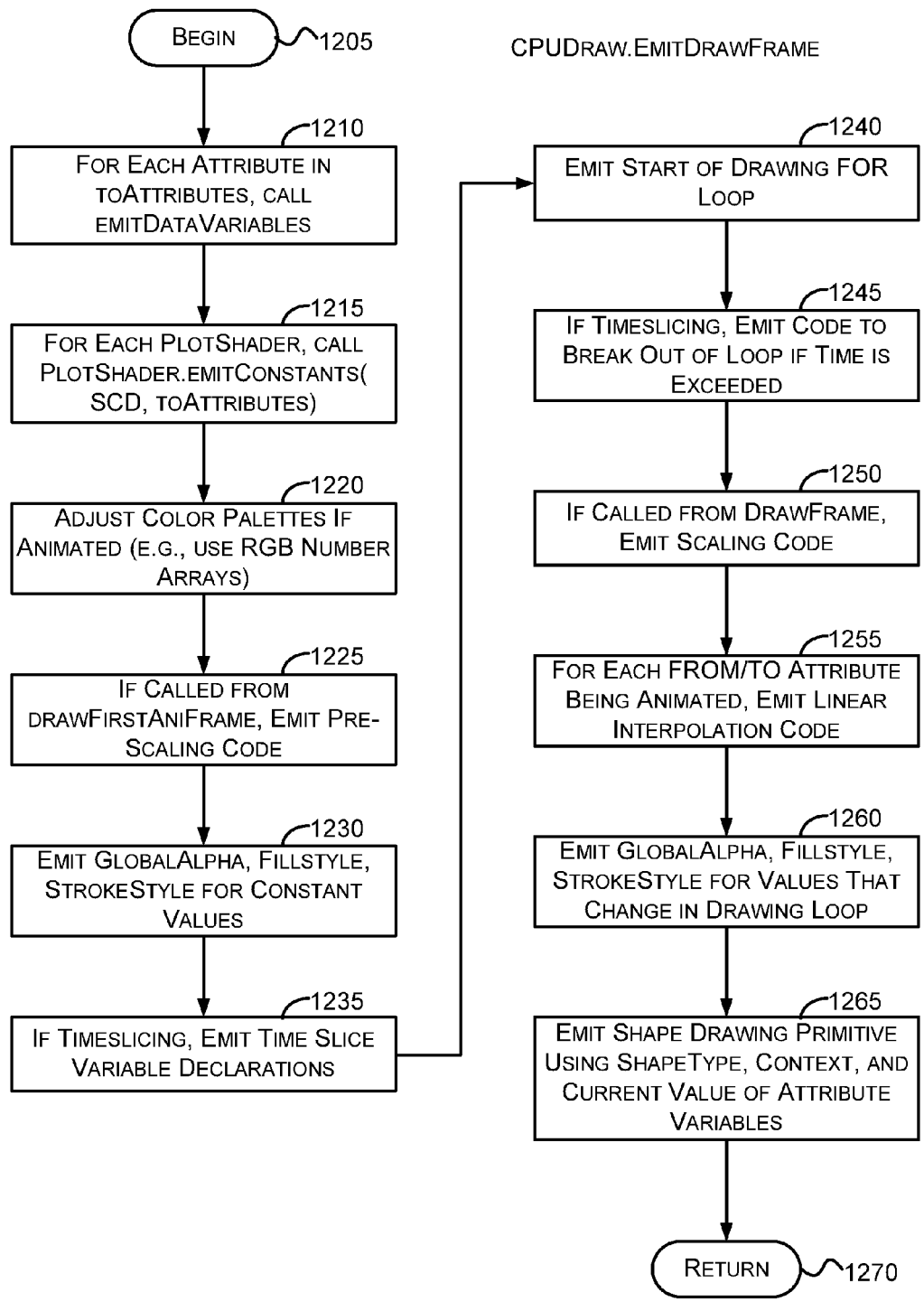

Turning to FIG. 12, this is where the CPU drawing code is generated. Time slicing allows a drawing cycle to be cut short so that a computer remains responsive to user input. In CPU drawing cycles and perhaps in some GPU drawing cycles there may be a certain amount of drawing the CPU or GPU may do during a period of time before the system becomes sluggish or non-responsive to a user of the system. The time slice allows a rendering to be done in chunks time limited by a value indicated by the time slice so that the system may remain responsive to user input.

At block 1210, the emitDataVariables indicate how to find data that is to be placed in a chart. For example, a declaration may state: var x=toAttributes.x._data. The data may be stored as a vector referenced by the above declaration.

At block 1215, constants are emitted.

At block 1220, color palettes are changes from strings to RBG number arrays if animation is going to occur.

At block 1225, any pre-scaling code is called.

At block 1230, constant styles that do not change within the rendering loop are emitted.

At block 1235, if time slicing is requested, time slice variable declarations are emitted. As indicated previously, this may be done to limit the amount of CPU time that is allowed for rendering before time is turned back to the foreground process to process user input.

At block 1240, the start of the FOR loop of the batch drawing is emitted.

At block 1245, time slice code is emitted if time slicing is requested.

At block 1250, scaling code is emitted by calling each plot shader (of the part being drawn) to emit its scaling/adjustment code for each attribute that it owns or adjusts.

At block 1255, linear interpolation code is emitted for each attribute that is being animated.

At block 1260, code is emitted to change values that change within the drawing loop. The properties specified in block 1260 are suitable for a Canvas 2D (HTML 5) implementation. In other implementations, other properties suitable for the underlying framework may be emitted.

At block 1265, shape drawing code is emitted to draw the shape indicated in the batch.

At block 1270, the actions continue after an action (e.g., of another figure) that called the actions of FIG. 12.

Figure 13:
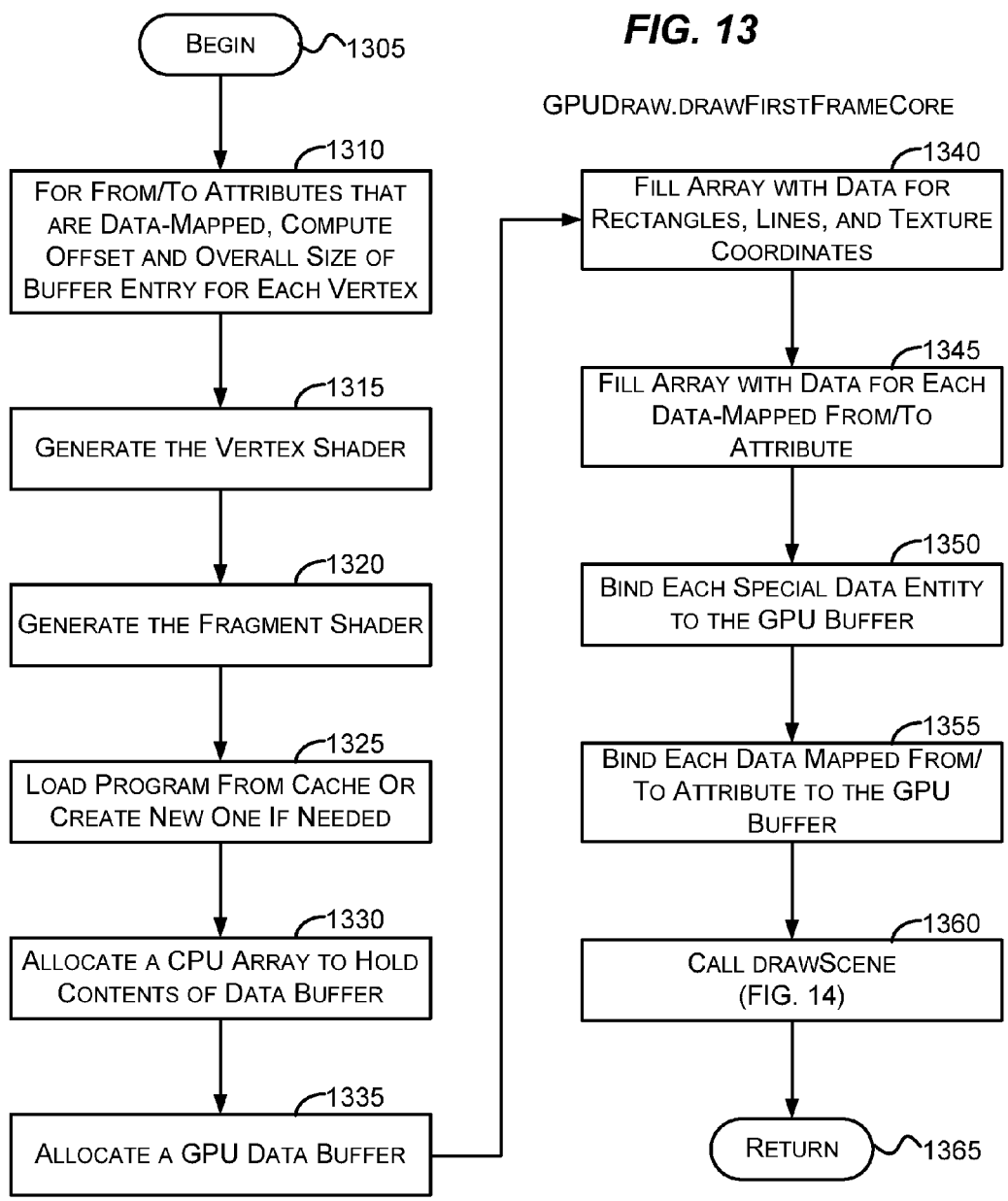

In FIG. 13, GPU code is being emitted for a GPU. Shown is FIG. 13 are steps suitable for a WebGL (HTML 5) implementation. In other implementations, other properties suitable for the underlying framework may be emitted. Data mapped values are attribute values that are based on a named data column. Turning to FIG. 13, at block 1305, the actions begin. At block 1310, for FROM/TO attributes that are data-mapped, the offset and overall size is computed of a buffer entry for each vertex.

At block 1315, the vertex shader is generated. This code generation includes emitting scaling code by calling each plot shader (of the part being drawn) to emit its scaling/adjustment code for each attribute that it owns or adjusts.

At block 1320, the fragment shader is generated.

At block 1325, the program is loaded from cache or created if needed.

At block 1330, a CPU array is allocated to hold contents of the data buffer.

At block 1335, a GPU data buffer is allocated.

At block 1340, the CPU array is filled with data for rectangles, lines, and texture coordinates.

At block 1345, the array is filled with data for each data-mapped FROM/TO attribute.

At block 1350, certain data entities are bound to the GPU buffer.

At block 1355, data-mapped FROM/TO attributes are bound to the GPU buffer.

Figure 14:
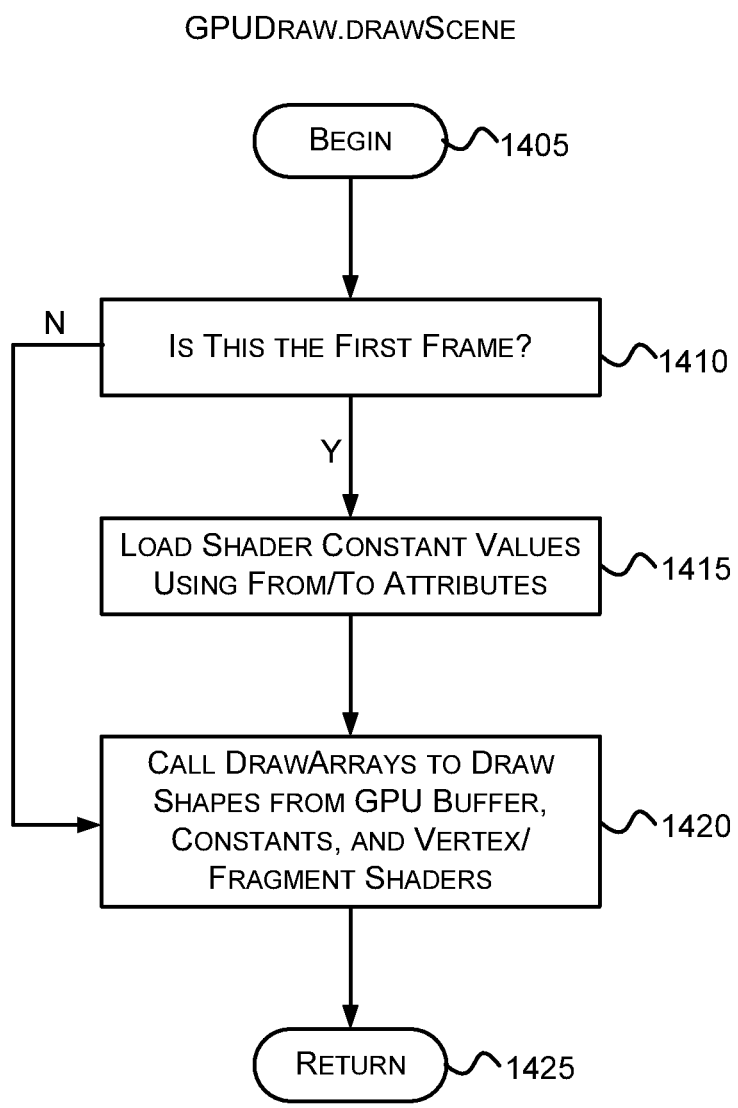

At block 1360, actions described in more detail in conjunction with FIG. 14 are performed.

At block 1365, the actions continue after an action (e.g., of another figure) that called the actions of FIG. 13.

Turning to FIG. 14, at block 1405, the actions begin. At block 1410, if this is the first frame, the actions continue at block 1415; otherwise, the actions continue at block 1420. At block 1415, shader constant values are loaded using FROM/TO attributes. At block 1420, DrawArrays is called to draw shapes from the GPU buffer, constants, and vertex/fragment shaders. At block 1425, the actions continue after an action (e.g., of another figure) that called the actions of FIG. 13.

Figure 15:
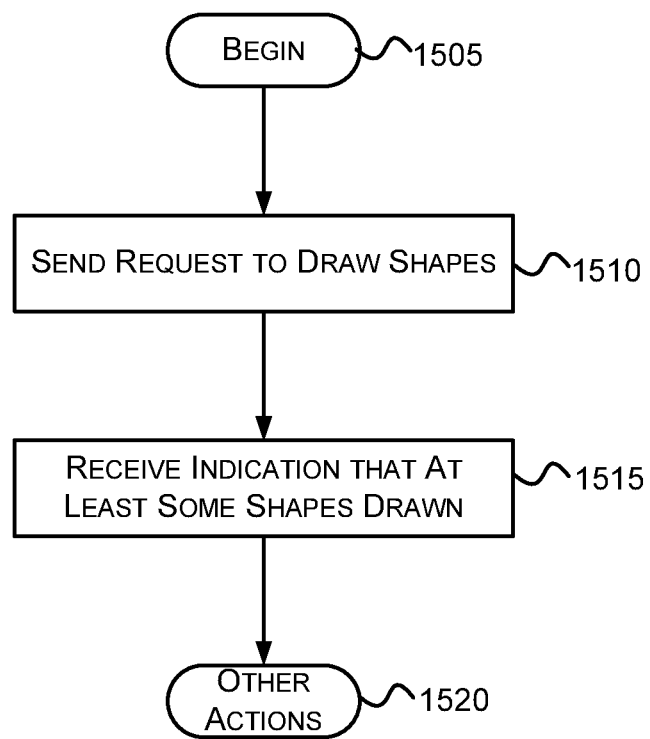
FIG. 15 is a flow diagram that generally represents actions that may occur from the perspective of a caller of a batch drawing engine in accordance with aspects of the subject matter described herein.

FIG. 15 is a flow diagram that generally represents actions that may occur from the perspective of a caller of a batch drawing engine in accordance with aspects of the subject matter described herein. Turning to FIG. 15, at block 1505, the actions begin. At block 1510, a request to draw shapes is sent. For example, an application may call a graphics drawing framework to draw a set of shapes.

At block 1515, an indication that at least some of the shapes have been drawn may be received. For example, if time slicing is enabled and CPU drawing is being performed, the graphics drawing framework may draw the shapes in chunks so that the system may remain responsive to user input. In one implementation, the number of shapes drawn is returned.

At block 1520, other actions if any, may be performed.

A batch engine (sometimes referred to in the drawings as the object Container) may draw shapes in batches using a GPU if available or a CPU if the GPU is not available. The batch engine may also do data mapping and animation. The batch engine will scale the data based on input values or default values.

Data attributes may be associated with a vector of values. For example, an attribute "color" may be associated with a vector of "sales" values. The vector of values represents a column of data from the current dataset.

Drawing surfaces may be stacked together. For example, a surface with text may be stacked on a surface with other graphics. In one example, one surface may be rendered by CPUDraw while the other surface may be rendered by GPUDraw. These two surfaces may then be displayed together.

The code emitters indicated herein may generate custom code that speeds the rendering of a chart. For example, if a batch engine knows that it is dealing with a certain type of shape, the batch engine may generate code that draws the shape without a conditional statement that asks what shape is being drawn. The code emitter may be structured to on-the-fly remove as many conditional statements as are known beforehand.

As can be seen from the foregoing detailed description, aspects have been described related to data visualization. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented by a computer, the method comprising:
   receiving, from a caller, a request to draw a set of shapes at an interface of a batch shape drawing engine, the set of shapes having a shape type that is common among the shapes, the set of shapes having a number, and the set of shapes having constant and data-mapped attribute values, the request indicating the shape type, the number of the shapes, and the constant and data-mapped attribute values to be used in drawing the shapes, wherein if the request involves animation, the request also indicates a from set of constant and data-mapped attribute values;
   determining that a device hosting the batch shape drawing engine has a graphical processing unit (GPU);
   after it is determined that the device has the GPU, generating GPU code suitable for the GPU to draw the set of shapes optimized for the constant and data-mapped attribute values specified by the caller, the GPU code omitting conditional statements that test values that are knowable prior to drawing the shapes;
   receiving, from a second caller, a second request to draw a second set of shapes at an interface of a second batch shape drawing engine, the second request indicating a second shape type, a second number of shapes, and a second constant and second data-mapped attribute values to be used in drawing the second set of shapes,
   determining that a second device hosting the second batch shape drawing engine does not have a graphical processing unit (GPU);
   based on determining that the second device does not have a GPU;
      generating central processing unit (CPU) code suitable for a CPU to draw the second set of shapes optimized for the second constant and second data-mapped attribute values provided by the second caller, the CPU code omitting the conditional statements that test values that are knowable prior to drawing the shapes.

2. The method of claim 1, wherein if the device has the GPU, the first set of actions further comprises generating GPU code to perform actions including:
   for the first frame of an animation sequence:
      obtaining from attributes for each of the shapes,
      obtaining to attributes for each of the shapes,
      packing a GPU buffer with the from attributes and the to attributes,
      generating shader code, and
      setting parameters for the constant attribute values; and
   for all frames of the animation sequence:
      setting a percent parameter, and
      calling shape drawing code of the GPU.

3. The method of claim 1, wherein if the device does not have the GPU, then the second set of actions further comprises generating CPU shader code to perform actions including:
   for a first frame of an animation sequence:
      generating code to:
         test for the first frame of the animation sequence and if the first frame of the animation sequence:
            obtain from attributes for each of the shapes,
            obtain to attributes for each of the shapes, and
            prescale the from attributes and the to attributes by calling plot shaders; and
      for all frames of the animation sequence:
         compute animated attribute values, and
         draw the shapes using the constant and data-mapped attributes and the animated attribute values; and
      after generating the CPU shader code, executing the CPU shader code using a different percent parameter to draw each animation frame of the animation sequence, each percent parameter serving as an index to identify a corresponding animation frame.

4. The method of claim 1, further comprising if the request involves a hover change then,
   if the device has the GPU, then the first set of actions further comprises generating GPU code to draw the shapes and omit drawing of a chart frame; and
   if the device does not have the GPU, then the second set of actions further comprises generating CPU code to draw the shapes and omit the drawing of the chart frame.

5. The method of claim 1, further comprising setting a one-shot timer to cause drawing of a next chunk of a frame after a time has elapsed to allow the device to become responsive to user input.

6. The method of claim 1, wherein if the device does not have the GPU, then the second set of actions further comprises generating CPU code to:

declare one or more time slice variables;
define a loop in which drawing is performed during iterations of the loop;
check during each iteration of the loop by using the one or more time slice variables if drawing time has been exceeded, and if so, break out of the loop to allow the device to become responsive to user input.

7. The method of claim 1, further comprising converting data records indicated by the request into a set of vectors that includes FLOAT or INT values for each column along with pre-computed MIN/MAX values or MIN/RANGE values.

8. The method of claim 7, wherein converting a data record into an INT value comprises mapping a non-numeric value to the INT value by using an index of the value and a string dictionary that holds the non-numeric value.

9. The method of claim 8, further comprising maintaining a 2-way index that maps the data records to strings and the strings to the data records.

10. In a computing environment, a system, comprising:
receiving, from a caller, a request to draw a set of shapes at an interface of the batch shape drawing engine, the set of shapes having a shape type that is common among the shapes, the set of shapes having a number, and the set of shapes having constant and data-mapped attribute values, the request indicating the shape type, the number of the shapes, and the constant and data-mapped attribute values to be used in drawing the shapes,
determining that a system has a graphical processing unit (GPU) available to the batch shape drawing engine,
after it is determined that the system has a GPU available to the batch shape drawing engine,
generating GPU code suitable for the GPU to draw the set of shapes specific to the constant and data-mapped attribute values specified by the caller, the GPU code omitting conditional statements that test values that are knowable prior to drawing the shapes,
receiving, from a second caller, a second request to draw a second set of shapes at an interface of a second batch shape drawing engine, the second request indicating a second shape type, a second number of shapes, and a second constant and second data-mapped attribute values to be used in drawing the second set of shapes,
determining that a second device hosting the second batch shape drawing engine does not have a graphical processing unit (GPU);
based on determining that the second device does not have the GPU available to the batch shape drawing engine
generating processor code suitable for the processor to draw the second set of shapes specific to the second constant and second data-mapped attribute values provided by the second caller, the processor code omitting conditional statements that test values that are knowable prior to drawing the shapes.

11. The system of claim 10, wherein the processor is further programmed to perform additional actions, the additional actions comprising if the request involves animation, identifying from the request a from set of constant and data-mapped attribute values.

12. The system of claim 11, wherein the processor is further programmed to perform yet additional actions, the yet additional actions comprising if the system has a GPU available to the batch shape drawing engine, then the first set of actions further comprises generating GPU code to:
obtain from attributes for each of the shapes;
obtain to attributes for each of the shapes; and
create animation code for each of the shapes that when executed shows movement of the shapes from the from attributes to the to attributes
and wherein if the system does not have a GPU available to the batch shape drawing engine, the second set of actions further comprises generating processor code to:
obtain from attributes for each of the shapes;
obtain to attributes for each of the shapes; and
create animation code for each of the shapes that when executed shows movement of the shapes from the from attributes to the to attributes.

13. The system of claim 10, wherein the processor is further programmed to perform additional actions, the additional actions comprising if the request involves a hover change then,
if the system has a GPU available to the batch shape drawing engine, then the first set of actions further comprises generating GPU code to draw the shapes and omit drawing of a chart frame; and
if the system does not have a GPU available to the batch shape drawing engine, then the second set of actions further comprises generating processor code to draw the shapes and omit the drawing of the chart frame.

14. The system of claim 10, wherein the processor is further programmed to perform additional actions, the additional actions comprising if the device does not have the GPU, then the second set of actions further comprises generating processor code to:
declare one or more time slice variables;
define a loop in which drawing is performed during iterations of the loop;
check during each iteration of the loop by using the one or more time slice variables if drawing time has been exceeded, and if so, break out of the loop to allow the device to become responsive to user input.

15. The system of claim 10, wherein the processor is further programmed to perform additional actions, the additional actions comprising converting data records indicated by the request into a set of vectors that includes FLOAT or INT values for each column along with pre-computed MIN/MAX values or MIN/RANGE values.

16. The system of claim 15, wherein the processor being programmed to perform additional actions comprises the processor being programmed to map a non-numeric value to the INT value by using an index of the value and a string dictionary that holds the non-numeric value.

17. A computer-readable storage media storing instructions that, when executed, perform a method, the emethod comprising:
receiving, from a caller, a request to draw a set of shapes at an interface of a batch shape drawing engine, the set of shapes having a shape type that is common among the shapes, the set of shapes having a number, and the set of shapes having constant and data-mapped attribute values, the request indicating the shape type, the number of the shapes, and the constant and data-mapped attribute values to be used in drawing the shapes, wherein if the request involves animation, the request also indicates a from set of constant and data-mapped attribute values;
determining that a device hosting the batch shape drawing engine has a graphical processing unit (GPU);
after it is determined that the device has the GPU,
generating GPU code suitable for the GPU to draw the set of shapes optimized for the constant and data-mapped attribute values specified by the caller, the GPU code omitting conditional statements that test values that are knowable prior to drawing the shapes;

receiving, from a second caller, a second request to draw a second set of shapes at an interface of a second batch shape drawing engine, the second request indicating a second shape type, a second number of shapes, and a second constant and second data-mapped attribute values to be used in drawing the second set of shapes, determining that a second device hosting the second batch shape drawing engine does not have a graphical processing unit (GPU);

based on determining that the second device does not have a GPU;

generating central processing unit (CPU) code suitable for a CPU to draw the second set of shapes optimized for the second constant and second data-mapped attribute values provided by the second caller, the CPU code omitting conditional statements that test values that are knowable prior to drawing the shapes.

18. The computer-readable storage media of claim 17, the method further comprising if the request involves a hover change then, if the device has the GPU, then the first set of actions further comprises generating GPU code to draw the shapes and omit drawing of a chart frame; and if the device does not have the GPU, then the second set of actions further comprises generating CPU code to draw the shapes and omit the drawing of the chart frame.

19. The computer-readable storage media of claim 17, the method further comprising setting a one-shot tinier to cause drawing of a next chunk of a frame after a time has elapsed to allow the device to become responsive to user input.

* * * * *